US010620830B2

(12) United States Patent
Donlan

(10) Patent No.: US 10,620,830 B2
(45) Date of Patent: Apr. 14, 2020

(54) RECONCILING VOLUMELETS IN VOLUME COHORTS

(71) Applicant: Amazon Technologies, Inc., Reno, NV (US)

(72) Inventor: Bryan James Donlan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 14/133,575

(22) Filed: Dec. 18, 2013

(65) Prior Publication Data

US 2015/0169253 A1  Jun. 18, 2015

(51) Int. Cl.
*G06F 3/00* (2006.01)
*G06F 3/06* (2006.01)
*G06F 11/10* (2006.01)
*G06F 11/14* (2006.01)

(52) U.S. Cl.
CPC ............ *G06F 3/0604* (2013.01); *G06F 3/065* (2013.01); *G06F 3/067* (2013.01); *G06F 3/0619* (2013.01); *G06F 3/0647* (2013.01); *G06F 3/0655* (2013.01); *G06F 11/1004* (2013.01); *G06F 11/1448* (2013.01)

(58) Field of Classification Search
None
See application file for complete search history.

(56) References Cited

U.S. PATENT DOCUMENTS

| 8,224,935 | B1 * | 7/2012 | Bandopadhyay ..... G06F 9/5072 370/256 |
| 8,452,819 | B1 | 5/2013 | Sorenson, III et al. |
| 2005/0246393 | A1 | 11/2005 | Coates et al. |
| 2012/0271795 | A1 * | 10/2012 | Rao ................... G06F 17/30575 707/613 |

(Continued)

FOREIGN PATENT DOCUMENTS

WO  2012178040  12/2012

OTHER PUBLICATIONS

International Search Report and Written Opinion from PCT/US14/71159, dated Apr. 30, 2015, Amazon Technologies, Inc., pp. 1-14.

(Continued)

*Primary Examiner* — Reginald G Bragdon
*Assistant Examiner* — Michael L Westbrook
(74) *Attorney, Agent, or Firm* — Robert C. Kowert; Kowert, Hood, Munyon, Rankin & Goetzel, P.C.

(57) ABSTRACT

Cohorts may be created on storage nodes in an object-redundant storage system that uses replication and/or a redundant encoding technique. In a cohort with N nodes, M data elements (replicas or shards) of an object are stored to M of the nodes that are selected from the N nodes. Metadata for locating other data elements for an object in the cohort may be stored with one or more of the data elements in the cohort. To reconcile the nodes, common object lists are generated on each node for at least one other node from the metadata, hashes of the lists may be exchanged among the nodes, and the hashes are compared. If the hashes for two nodes differ, specific differences are determined, and a reconciliation process performs reconciliation based on the determined differences.

18 Claims, 13 Drawing Sheets

(56) References Cited

U.S. PATENT DOCUMENTS

2012/0330892 A1* 12/2012 Benjamin ......... G06F 17/30212
707/622
2013/0124525 A1   5/2013 Anderson et al.
2013/0138607 A1   5/2013 Bashyam et al.
2013/0275815 A1  10/2013 De Keyser et al.
2013/0339818 A1* 12/2013 Baker ................... G06F 11/10
714/763

OTHER PUBLICATIONS

Proceedings of the Ninth International Conference on Architectural Support for Programming Languages and Operating Systems, "OceanStore: An Architecture for Global-Scale Persistent Storage", John Kubiatowicz, et al., Nov. 2000, pp. 1-12.
J. J. Wylie, M. W. Bigrigg, J. D. Strunk, G. R., Ganger, H. Kilite, P. K. Khosla, "Survivable Information Storage Systems", IEEE Computer 33 (8), IEEE, Aug. 2000, pp. 61-68.
A. Malik and P. Lakshman, "Cassandra: a decentralized structured storage system," SIGOPS Operating System Review, vol. 44, No. 2, 2010.
R. Rodrigues and B. Liskov, "High availability in DHTs: Erasure coding vs. replication," in Proc. IPTPS, 2005.
U.S. Appl. No. 14/133,522, filed Dec. 18, 2013, Paul David Franklin.

\* cited by examiner

RECONCILING VOLUMELETS IN VOLUME COHORTS

BACKGROUND

A typical data storage application or service may receive requests to store data objects on behalf of one or more clients and store the data objects to one or more storage nodes. Some data storage services, which may be referred to as object-redundant storage systems, may store data objects using a redundancy technique or scheme in order to provide a higher level of durability for the stored data. For example, a data storage service may replicate the data objects it stores across two or more different storage nodes or locations to increase the likelihood that data objects will survive the failure of any given storage node or combination of nodes. In some object-redundant storage systems, each replica need not correspond to an exact copy of the object data. For example, in some object-redundant storage systems, a data object may be divided into a number of portions or "shards" according to a redundant encoding technique (e.g., erasure encoding), and each of the shards may be stored to a different storage node.

In systems in which data objects are simply replicated across multiple nodes, only one replica needs to be retrieved to retrieve the data object. However, when using a redundant encoding technique such as erasure encoding, a data object may generally be recreated from more than one, but fewer than all, of the generated shards. For example, using an erasure encoding technique that generates 20 shards from a data object, at least 10 shards may be required to recreate the data object.

Figure 1:
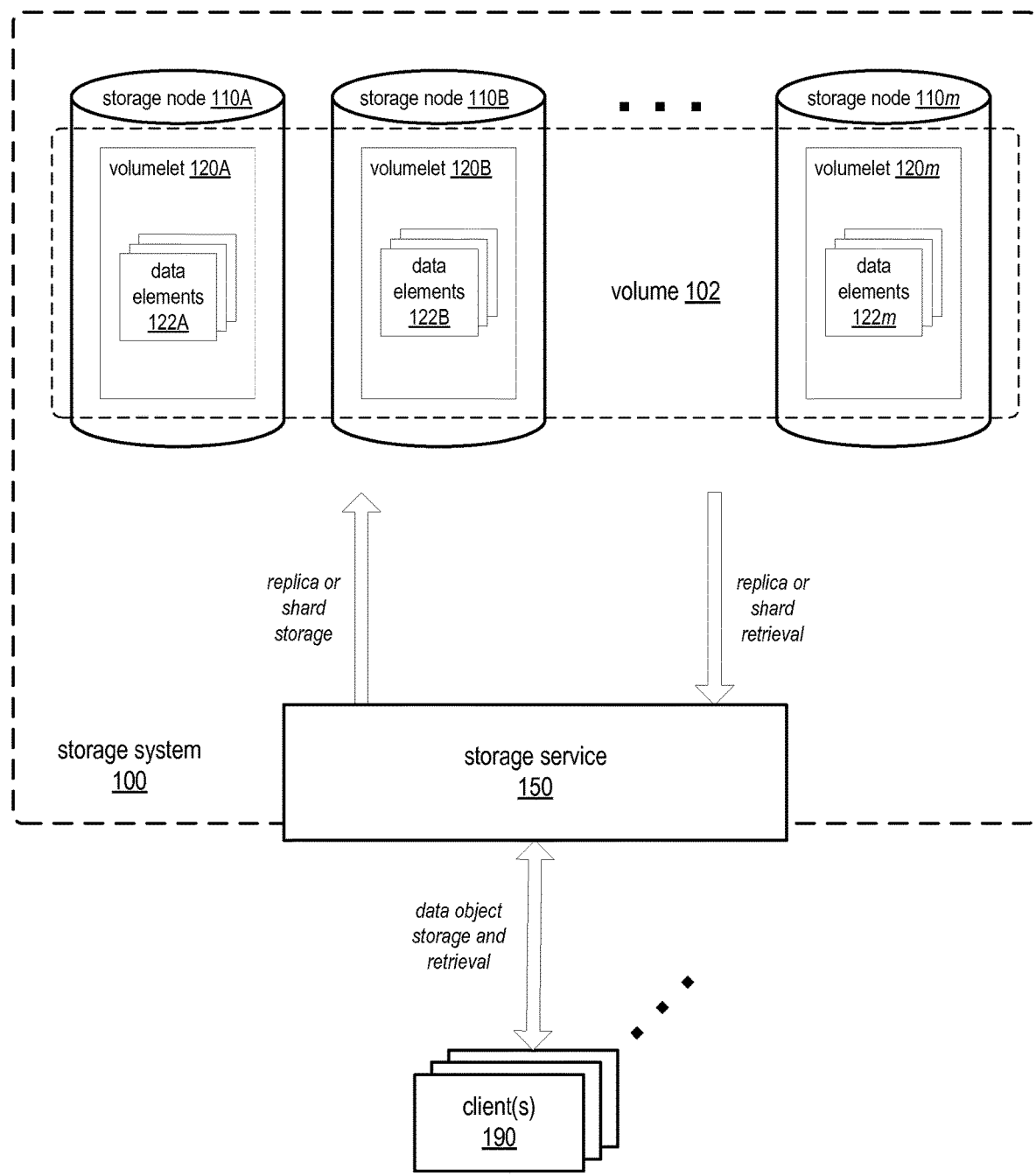
FIG. 1 illustrates an object-redundant storage system in which data objects are stored to aggregate groups of storage locations, where one data element generated from a given data object is stored to each location in the group.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing volume cohorts in object-redundant storage systems are described. In an object-redundant storage system, data objects may be replicated according to a replication technique and the replicas may be stored to two or more different storage locations. Instead or in addition, a redundant encoding technique such as erasure encoding may be used in an object-redundant storage system to generate multiple shards from a data object, and the shards may be stored across multiple different storage locations. For the purpose of this document, replication techniques and redundant encoding techniques may collectively be referred to as object-redundant techniques. For the purpose of this document, replicas and shards of data objects may be collectively referred to as object-redundant data elements, or simply data elements, where one data element corresponds to one replica or one shard of a given data object. Also note that a data object as used herein may be any type of data, and may be of any size that may be stored to locations in an object-redundant storage system. Moreover, a data object may include a single data element or single type of data, a collection of data elements of the same type or of different types, or even a collection of data objects.

A conventional technique for locating these data elements (replicas or shards) of persisted data in an object-redundant storage system is to choose the locations for the data elements for every data object independently, for example using a random selection or some other technique to select a set of locations for the data elements generated for a given data object from among all of the storage nodes in the storage system. However, this method generally involves a large amount of metadata for tracking the storage locations of the data elements for each object, and may involve a large amount of overhead when locating a data object for retrieval and/or when recovering from a failed storage device or node.

As an alternative to the above technique that may reduce the amount of metadata needed for tracking and reduce the overhead in retrieving data objects, groups of storage devices or portions of storage devices may be created in a storage system. Data objects may then be assigned to a group, with one data element generated from a given data object stored to each member device (or portion of a device) in the group. To locate a data object, the group on which the data object is stored is first located, and then the data object may be retrieved from the location(s) in the group. An example storage system 100 that implements this technique is illustrated in FIG. 1. A storage system 100 may include multiple storage nodes 110 and a storage service 150 that provides an interface (e.g., an application programming interface (API)) via which one or more clients 190 may store data objects to and retrieve data objects from storage system 100. As shown in FIG. 1, a group of storage nodes 110A-110m or portions of storage nodes 110A-110m may constitute or contain a volume 102. Note that there may be more storage nodes 110, other groups of storage nodes 110, and other volumes 102 in storage system 110 than those shown in FIG. 1.

In the broadest sense, a volume, as used herein, is a collection of data objects, and may be viewed as a virtual storage device that may be spread across two or more physical storage nodes 110. For example, volume 102 is spread across nodes 110A-110m as shown in FIG. 1. A volume 102 may be viewed as being composed of multiple volumelets 120. A volumelet 120 may generally be a contiguous block of storage on a storage node 110, and each volumelet 120 may contain thousands or millions of data elements 122. Each volumelet 120 resides on a single storage node 120; however, a volume 102's volumelets 120 each may typically reside on a different storage node 110. While not shown in FIG. 1, two or more volumelets 120 from two or more different volumes 102 may co-exist on the same storage node 110. Further, two or more volumes 102 in a storage system 100 may span the same storage nodes 110, different groups of storage nodes 110, or overlapping groups of storage nodes 110. While a volume 102 may be composed of multiple volumelets 120, the storage service 150 interface may present the volume 102 to the client(s) 190 as a single virtual storage device or system.

In the storage system 100 illustrated in FIG. 1, the data elements 122 on each volumelet 120 of a volume 102 may correspond to the same set of data objects, and each data object has a data element 122 (a shard or replica) stored on each volumelet 120. In other words, each volumelet 120 includes a data element 122 (a shard or replica) for each of the data objects stored to the volume 102, and a volumelet 120 may thus be viewed as a single replica, or "shard", of a volume 102. Using FIG. 1 to illustrate this, if a replication technique is used to persistently store data objects received from client(s) 190, then a replica of each data object is stored to each of the volumelets 120A-120m of volume 102 as a data element 122, and the set of data elements 122 on each volumelet 120 should generally be identical. Alternatively, if a redundant encoding technique (e.g., erasure encoding) is used to persistently store data objects received from client(s) 190, then m shards are generated from each data object, and a different one of the shards is stored to each of volumelets 120A-120m of volume 102 as a data element 122. Thus, the data elements 122 in the volumelets 120 of volume 102 should generally all correspond to the same set of data objects.

In a storage system 100 in which data objects are replicated in the volumelets 120 across the nodes 110, only one replica needs to be retrieved from the volume 102 to retrieve the data object. However, when using a redundant encoding technique such as erasure encoding in a storage system 100, a data object may generally be recreated from more than one, but fewer than all, of the generated shards stored in the volumelets 120. For example, using an erasure encoding technique that generates m shards from a data object and stores a different one of the shards as a data element 122 to each of the volumelets 120A-120m as shown in FIG. 1, a shard would need to be retrieved from some subset of the m volumelets 120 to recreate a corresponding data object. As a non-limiting example, an erasure encoding scheme may be used in which m shards are created and half the shards are necessary to recreate the data objects, and therefore the (minimum) number of shards that are needed to recreate a data object may be m/2.

While a technique for storing data elements in an object-redundant storage system as described above in reference to FIG. 1 may reduce the amount of metadata needed to track data objects and may reduce the overhead needed to retrieve a given data object when compared to the first technique described in which the data elements (replicas or shards) are stored to locations selected for each data element independently, the technique illustrated in FIG. 1 creates the potential for a condition that may be referred to as a correlated failure.

Using the first or second techniques, if a single (or even a few) storage node in the storage system goes down, then data object(s) stored on that node can generally be recovered from data elements (replicas or shards) stored on other storage nodes in the storage system. However, multiple node failures in a storage system may result in some data loss. Using the first technique a multiple node failure in the storage system may result in some individual data objects being lost and not recoverable from the storage system. For example, if each data element (shard or replica) is stored to each of four nodes independently selected from an arbitrarily larger number of nodes in the storage system, then a failure of four nodes in the storage system may result in some relatively small subset of distinct data objects being lost.

However, using the second technique, a multiple node failure may potentially result in an entire volume of data objects being lost. Using the second technique, generally, if any data objects are lost from a volume due to a multiple node failure, then all of the data objects from the volume are lost. This is what is referred to as a correlated failure. Using a replication scheme in which m replicas are stored to m volumelets in a volume, then losing m storage nodes in a storage system may result in the loss of all of the data objects stored in one or more volumes that span those particular m storage nodes. Using a redundant encoding technique such as erasure encoding in which m shards of a data object are stored to m volumelets in a volume and in which a subset of the shards are needed to recreate the data object, then losing one more than the fraction of the m storage nodes needed to recreate data objects in the storage system (e.g., (m/2)+1 storage nodes, if ½ of the m shards are needed to recreate a data object) may result in the loss of all of the data objects stored in one or more volumes that span those particular m storage nodes.

While the mean time between failure (MTBF) of individual data objects using the two techniques described above may be close or the same, a multiple node failure using the second technique that results in a correlated failure and that thus affects entire volume(s) may be much more visible, and much less desirable, for clients of the storage system than a multiple node failure using the first technique in which generally uncorrelated data objects may be lost.

Volume Cohorts in Object-Redundant Storage Systems

Embodiments of methods and apparatus for providing volume cohorts in object-redundant storage systems are described that may provide advantages of the above two techniques while reducing the problems of the two techniques. Embodiments of a volume cohort technique or method are described that may be implemented in object-redundant storage systems and that may reduce the amount of metadata needed to track data objects and/or the overhead needed to retrieve a given data object when compared to the first technique, while at the same time reducing or eliminating the correlated failure problem of the second technique.

In embodiments, volume cohorts, or simply cohorts, may be created that span sets or groups of storage nodes in an object-redundant storage system. Similar to the volumes described for the storage system as illustrated in FIG. 1, a cohort in an object-redundant storage system may be viewed as a virtual storage device that may be spread across two or more physical storage nodes. However, unlike the volumes described in reference to FIG. 1, a given data object stored to a cohort according to an object-redundant technique spans only a subset of the storage nodes in the cohort. Thus, if there are N storage nodes in a cohort, then the data elements (replicas or shards) of any given data object are only stored to M of the storage nodes in the cohort, where M is less than N. Similar to the volumes described for the storage system as illustrated in FIG. 1, a volumelet of the cohort is located on each of the N storage nodes in the cohort. However, unlike in the storage system as illustrated in FIG. 1, the cohort volumelets are not identical; that is, the cohort volumelets do not each contain a set of data elements for the same set of data objects, as each data object stored to the cohort does not have a data element (a shard or replica) stored on each volumelet of the cohort.

Figure 2A:
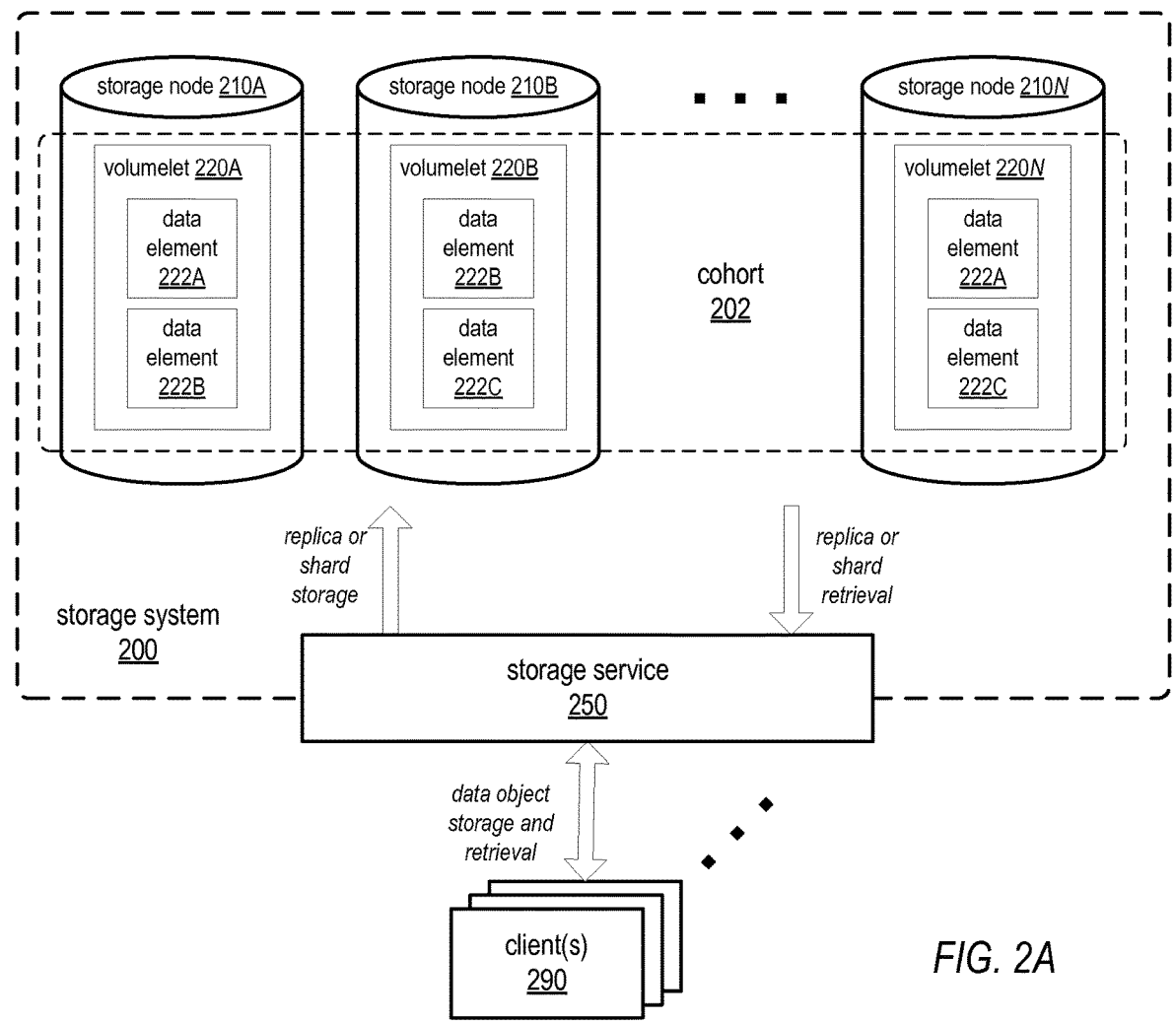
FIGS. 2A and 2B illustrate an object-redundant storage system that implements volume cohorts, according to at least some embodiments.
Figure 2B:
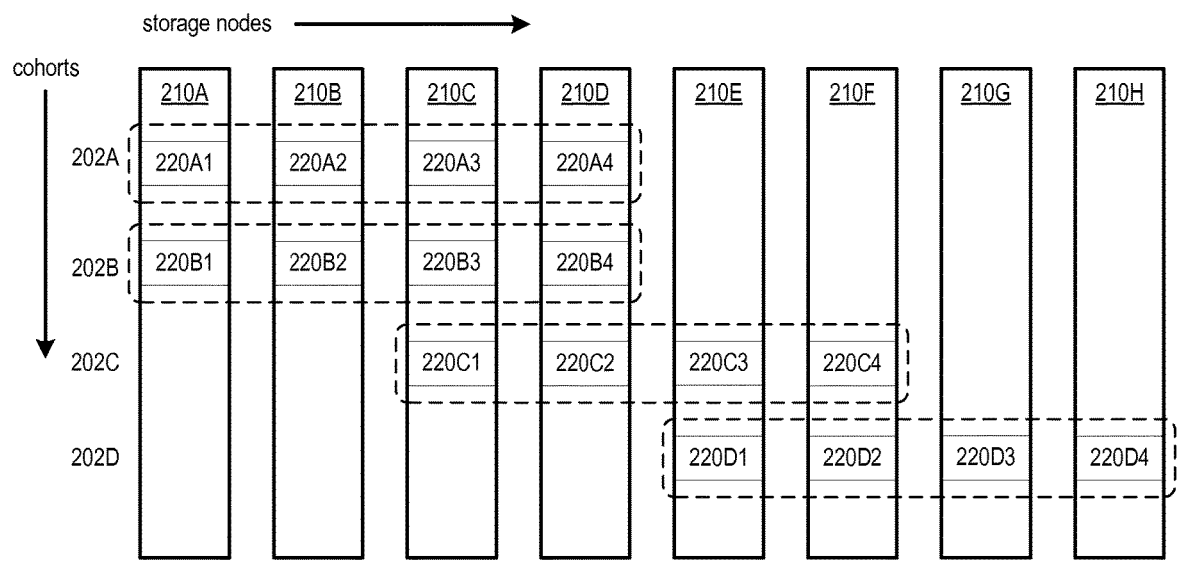

FIGS. 2A and 2B illustrate an object-redundant storage system that implements volume cohorts according to at least some embodiments. As shown in FIG. 2A, a storage system 200 may include multiple storage nodes 210 and a storage service 250 that provides an interface (e.g., an application programming interface (API)) via which one or more clients 290 may store data objects to and retrieve data objects from storage system 200. Note that the storage system 200 may generally be any storage system that provides object-redundant storage to client(s). For example, the storage system 200 may be a local storage system coupled to one or more client devices, a network-based storage system 200 coupled to a local network and accessible to multiple clients on the local network, or a remote, virtualized storage system implemented on a provider network, provided as a remote, virtualized storage service to multiple clients, and accessible to the clients according to an API and via an intermediate network such as the Internet.

As shown in FIG. 2A, a cohort 202 may span multiple storage nodes 210A-210N in a storage system 200. Cohort 202 may be viewed as a virtual storage device that is spread across the nodes 210A-210N as shown in FIG. 2A. Cohort 202 may include multiple volumelets 220A-220N, where each volumelet 220 may be a contiguous block of storage on a storage node 210, and each volumelet 220 stores data elements 222 (shards or replicas) of data objects that are stored to the storage system 200. Each volumelet 220 resides on a single storage node 220; however, a cohort 202's volumelets 220 typically reside on different storage nodes 210. Further, while a cohort 202 may be composed of multiple volumelets 220, the storage service 250 interface may present the cohort to the client(s) 290 as a single virtual storage device or system.

Note that FIG. 2A shows just one cohort 202 spread across N storage nodes 210 for simplicity. However, there may be more storage nodes 210 and more cohorts 202 in a storage system 210 than those shown in the example of FIG. 2A. As shown in FIG. 2B, two or more cohorts 202 in a storage system 200 may span the same storage nodes 210 (cohorts 202A and 202B in FIG. 2B), different groups of storage nodes 210 (cohorts 202A and 202D in FIG. 2B), or overlapping groups of storage nodes 210 (cohorts 202A and 202C in FIG. 2B). Thus, two or more volumelets 220 from two or more different cohorts 202 may co-exist on the same storage node 210. For example, storage node 210C in FIG. 2B includes volumelet 220A3 of cohort 202A, volumelet 220B3 of cohort 202B, and volumelet 220C1 of cohort 202C. Thus, each storage node 210 in a storage system 200 may participate in multiple cohorts 202, and two or more cohorts 202 in which a given storage node 210 participates may have different member nodes 210 (that is, different sets of storage nodes 210 that participate in the respective cohorts 202).

Referring again to FIG. 2A, given N storage nodes 210 in a cohort 202, then the data elements 222 (replicas or shards) of any given data object are only stored to M of the volumelets 220 on the storage nodes 210 in the cohort 202, where M is less than N. Further, the particular M volumelets 220 to which the data elements 222 for each data object are stored may be determined by a selection technique (e.g., a random selection technique) that selects the M volumelets 220 from among all N volumelets 220 such that the data elements 222 are distributed among all N volumelets 220. In other words, the set of M volumelets 220 to which the data elements 222 for a first data object are stored may generally be (but is not necessarily) a different set of M volumelets 220 to which the data elements 222 for a second data object are stored.

Thus, in the example storage system 200 illustrated in FIG. 2A, unlike the volumes 102 in the example storage system illustrated in FIG. 1, the data elements 222 on each volumelet 220 of the cohort 202 do not correspond to the same set of data objects, as the data elements 222 for a given data object are stored to only a subset of the N volumelets 220. For example, in FIG. 2A, data element 222A is stored on volumelets 220A and 220N, but not on volumelet 220B, and data element 222B is stored on volumelets 220A and 220B, but not on volumelet 220N.

In a storage system 200 as illustrated in FIG. 2A, if a replication technique is used to persistently store data objects received from client(s) 290, then M volumelets are selected from the N volumelets of cohort 202, and a replica of the data objects is stored to each of the M volumelets as a data element 222. Alternatively, if a redundant encoding technique (e.g., erasure encoding) is used to persistently store data objects received from client(s) 290, then M shards are generated from each data object, M volumelets are selected from the N volumelets of cohort 202, and a different one of the shards is stored to each of the selected M volumelets as a data element 222. Note that in a system in which a redundant encoding technique such as erasure encoding is used, the total number of shards generated by the technique may determine M.

In a storage system 200 as illustrated in FIG. 2A in which data objects are replicated across M of the N volumelets 220 of cohort 202, only one replica needs to be retrieved from the cohort 202 to retrieve the data object. However, when using a redundant encoding technique such as erasure encoding in a storage system 200, a data object may generally be recreated from more than one, but fewer than all, of the generated shards stored in the volumelets 220. For example, using an erasure encoding technique that generates M shards from a data object and stores a different one of the shards as a data element 222 to each of the M selected volumelets 220 as shown in FIG. 2A, a shard would need to be retrieved from some subset of the M volumelets 220 to recreate a corresponding data object. As a non-limiting example, an erasure encoding scheme may be used in which M shards are created and half the shards are necessary to recreate the data objects, and therefore the (minimum) number of shards that are needed to recreate a data object may be M/2. In this document, the number of shards that are needed to recreate a data object using a redundant encoding scheme such as erasure encoding may be referred to as R; therefore, in this example, R=M/2. As just one specific example, an erasure encoding scheme may be used in which 20 shards are generated for a data object (M=20), and 10 shards are required to recreate the data object (R=10). As another example, an erasure encoding scheme may be used in which 22 shards may be generated for a data object (M=22), with 11 shards required to recreate the data object (R=11).

In some implementations of a cohort 202 in a storage system 200 as illustrated in FIG. 2A, M may be selected to be half of N, or N may be selected to be twice M. For example, in example implementations, M=20 and N=40, or M=22 and N=36. In these implementations, each data object is stored to exactly half of the volumelets 220 in the cohort 202. However, other values for M and/or N, and other ratios of N to M, may be used in embodiments. To provide some non-limiting examples, N may be selected to be 4M (e.g. M=10 with N=40), or M=20 with N=22.

The selection of M and N, and the ratio of N to M, may be implementation specific and may be based on factors including but not limited to a particular redundant encoding scheme used, the number of storage nodes available, and tradeoffs between performance overhead and data loss protection. In regard to tradeoffs between performance overhead and data loss protection, note that a higher ratio of N to M (e.g., 3:1, 4:1, or more) may lower the expected number of data objects that would be lost in a given event while increasing overhead since more storage nodes are involved, while a lower ratio of N to M (e.g., 2:1, 3:2, or less) may increase the expected number of data objects that would be lost in a given event with less overhead. For a given implementation, values for M and N may be determined that provide an adequate level of risk reduction with an acceptable amount of overhead for the implementation. Some binomial calculations are provided later in this document that may be used in evaluating and possibly selecting values for M and N.

Figure 3A:
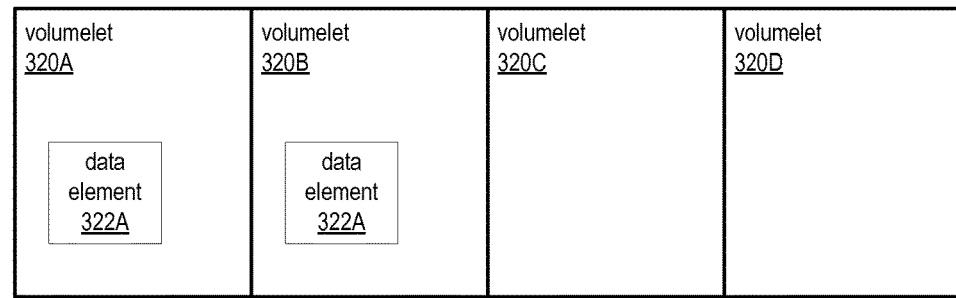
FIGS. 3A and 3B illustrate example cohorts, according to at least some embodiments.

To illustrate how volume cohorts 202 in storage systems 200 as illustrated in FIG. 2A may overcome the correlated failure problem that may occur in storage systems 100 as illustrated in FIG. 1 in which each data object is stored across all of the volumelets 120 in a volume 102, a simple example cohort 302A is provided in FIG. 3A. In cohort 302A, M=2, and N=4, so there are four volumelets 320A-320D, and two data elements 222 (replicas or shards) for a given data object may be created and stored to any two of the volumelets 320 as determined by a selection technique. FIG. 3A shows a data element 222A (which may be replicas or a data object or shards created from a data objects) stored to volumelets 320A and 320B. Given four volumelets from which any two are to be selected, there are six possible unordered combinations C of two volumelets 320 to which the data elements 322 for a data object may be stored:

[AB, AC, AD, BC, BD, CD]

Note that order is not important; in other words AB=BA and CD=DC. Assuming a random distribution of data elements among the four volumelets 320 in the cohort 302A, for replicated data objects, the odds that a given data object will be lost given the failure of two of the four storage nodes that host the volumelets 320 are 1 in 6. In other words, if two of the four storage nodes that host the volumelets 320 are lost, only about 1 out of 6 of the data objects stored in the cohort 302A according to a replication technique may be lost.

Generalizing, the number of unordered combinations C of volumelets in a cohort to which data objects may be stored from values for M and N is given by the binomial coefficient $$\binom{n}{k},$$

which is read "n choose k":

$$C = \binom{n}{k} = \frac{n!}{k!(n-k)!}$$

where n! is a factorial function, and where k=M and n=N. For example, for M=2 and N=4 as shown in FIG. 3A, there are $$\binom{4}{2} = 6$$

combinations of volumelets to which data objects may be stored.

Figure 3B:
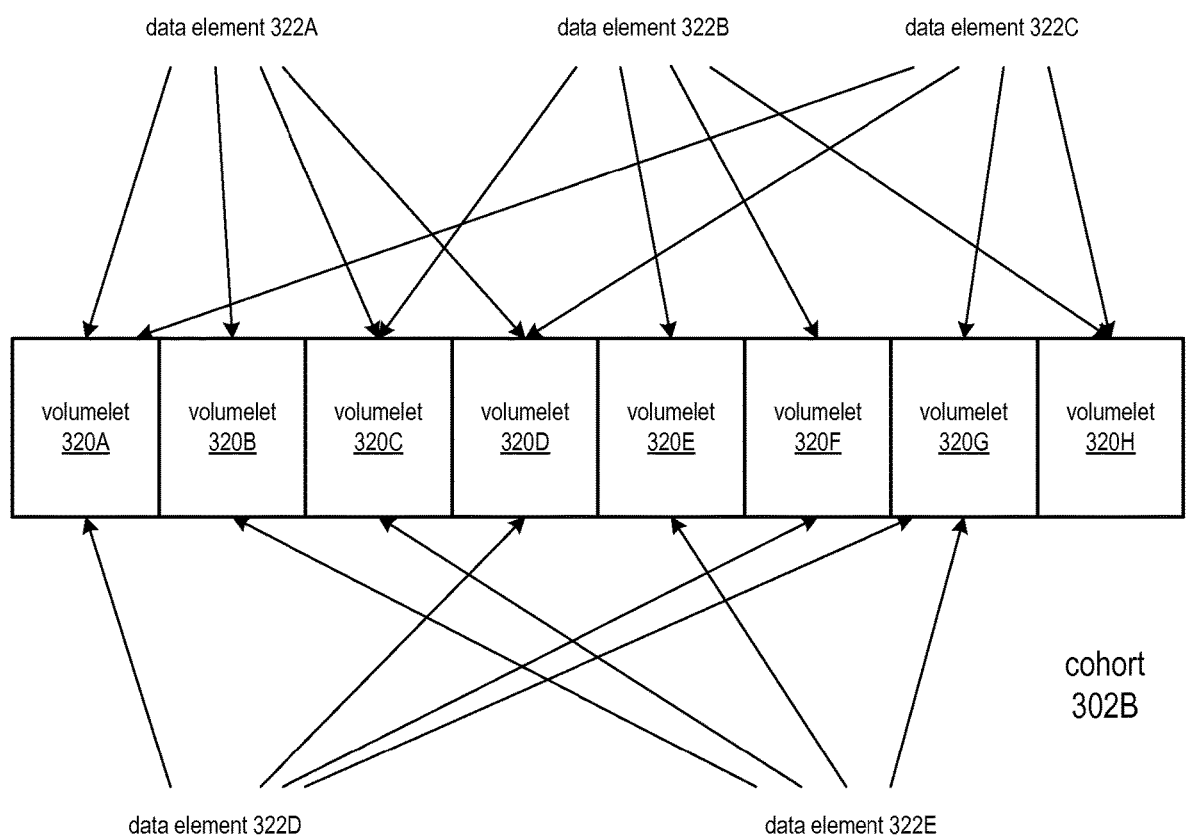

FIG. 3B shows an example cohort 302B in which there are eight volumelets 320A through 320H, and in which the data elements 322 for each data object are stored to four of the volumelets 320. Thus, in cohort 302B of FIG. 3B, M=4 and N=8. Applying the binomial coefficient to find the number of combinations:

$$C = \binom{8}{4} = 70$$

Thus, there are 70 possible combinations of four volumelets/storage nodes to which data objects may be stored in cohort 302B, and the loss of any combination of four of the eight storage nodes in cohort 302B may result in the loss of about 1 out of 70 of the data objects when using replication. Different combinations of volumelets 320 in cohort 302B at which the data elements 322 from five example data objects are shown in FIG. 3B. For example, data elements 322A for a first data object are stored to 320A, 320B, 320C, and 320D, while data elements 322B for a second data object are stored to 320C, 320E, 320F, and 320H.

A few other non-limiting examples of unordered combinations C given different values for M and N are presented below:

$$M = 10, N = 20: C = \binom{20}{10} = 184{,}756$$

$$M = 18, N = 36: C = \binom{36}{18} = 9{,}075{,}135{,}300$$

$$M = 18, N = 20: C = \binom{20}{18} = 190$$

Thus, as an example of how volume cohorts 202 in storage systems 200 as illustrated in FIG. 2A may overcome the correlated failure problem that may occur in storage systems 100 as illustrated in FIG. 1, in a cohort in which M=10 and N=20, C=184,756, and using a replication scheme in which M replicas of a data object are stored to M volumelets in the cohort and in which different combinations of M volumelets are selected from the N volumelets according to a selection technique, then losing M storage nodes in the storage system may result in the loss of only about 1 out of 184,756 of the data objects stored to a cohort spanning N storage nodes that includes those particular M storage nodes. Moreover, if fewer than M storage nodes are lost from a cohort, then generally no replicated data objects are lost, as at least one of the remaining volumelets should include a replica for any given data object, and a data object may be recovered from a single replica.

The calculation to find the number of data objects that are lost given a failure of a certain number of storage nodes is different in a cohort when using a redundant encoding technique such as erasure encoding in which M shards of a data object are stored to M volumelets selected from the N volumelets in a cohort according to a selection technique, and in which a subset R of the shards are needed to recreate the data object. In such a system, a data object may be lost if (M−R)+1 shards are lost. As a simple example, in a cohort in which R=2, M=4 and N=8, a data object may be lost if (4−2)+1=3 shards are lost. Thus, even though each data object is stored (as shards) to four of the eight volumelets in the cohort, a loss of any three volumelets may result in the loss of any data objects that happen to have shards stored to all three of the lost volumelets. Thus, instead of:

$$C = \binom{N}{M} = \binom{8}{4} = 70$$

as is the case when storing data objects using replication, the calculation becomes:

$$C = \binom{N}{(M-R)+1} = \binom{8}{3} = 56$$

In other words, the loss of any three volumelets in this example cohort in which R=2, M=4, and N=8 results in the loss of about 1 out of 56 of the data objects that are stored as shards to the cohort according to a redundant encoding scheme.

Given a loss of any four volumelets in this example cohort, since there are four possible unordered combinations of three volumelets in a set of four volumelets:

$$C = \binom{4}{3} = 4$$

Thus, a failure of any four volumelets may result in the loss of about 4 out of 56, or 1 in 14, of the data objects stored in the cohort according to the redundant coding technique.

As another example, in a cohort in which R=5, M=10 and N=20, a data object may be lost if (10−5)+1=6 shards are lost, and the calculation is:

$$C = \binom{20}{6} = 38{,}760$$

In other words, the loss of any six volumelets in this example cohort results in the loss of about 1 out of 38,760 of the data objects that are stored as shards to the cohort according to a redundant encoding scheme. Given a loss of any ten volumelets in this example cohort, since there are 210 possible unordered combinations of six volumelets in a set of ten volumelets:

$$C = \binom{10}{6} = 210$$

Thus, a failure of any ten volumelets may result in the loss of about 210 out of 38,760, or about 1 in 185, of the data objects stored in the cohort according to the redundant coding technique.

Note that, if fewer than (M−R)+1 storage nodes are lost from a cohort in which a redundant encoding scheme such as erasure encoding is used, then generally no data objects are lost, as the remaining volumelets in the cohort should include enough shards to recreate any given data object.

The above calculations may, for example, be used to find the potential loss rate in particular cohort configurations and with particular redundant encoding schemes, and thus may be used to evaluate risk at different values of R, M, and N in object redundant storage systems that employ volume cohorts. The results may, for example, be used in evaluating tradeoffs between performance overhead and data loss protection, in selecting redundant encoding schemes, and in selecting values for R, M, and/or N in particular volume cohort implementations Selecting Sets of Volumelets In embodiments, the particular M volumelets in a cohort to which the data elements for each data object are stored may be determined by a selection technique that selects the M volumelets from among all N volumelets such that the data elements are distributed more or less evenly among all N volumelets. In other words, the set of M volumelets to which the data elements for a first data object are stored may generally be (but is not necessarily) a different set of M volumelets to which the data elements for a second data object are stored. In some embodiments, a random or pseudo-random technique may be used to select the particular set of volumelets to which the data elements for a given data object are to be stored. However, in some embodiments, one or more factors may be considered when selecting the M volumelets from a cohort on which to store a data object. These factors may include one or more of, but are not limited to, available storage space on the storage nodes in the cohort, current availability of the storage node, and bandwidth considerations to the storage nodes.

In some embodiments, selecting the particular M volumelets in a cohort to which the data elements for a given data object are to be stored may be at least in part based on the identity of the data object, or on a transformation (such as a hash) of the identity. As an example of an identity of a data object, in at least some embodiments, each data object may be indicated by an object identifier (object ID) that may uniquely identify the data object in the storage system. The object IDs may be of any suitable type (alphanumeric string, numeric, etc.) and of any suitable length or size (32-bit, 64-bit, 128-bit, etc.).

As an example of selecting volumelets based on data object identity, the N storage nodes in a cohort may be split into N/2 pairs of storage nodes, a given bit of a hash (or other transformation) of the identity of a data object may correspond to a given pair of storage nodes, and the bit may be used to indicate which storage node in that given pair contains a data element for this data object. As a simple illustration, in a cohort with 16 storage nodes/volumelets designated as A–P, the storage nodes may be paired as follows:

| Pair 1 | Pair 2 | Pair 3 | Pair 4 | Pair 5 | Pair 6 | Pair 7 | Pair 8 |
|--------|--------|--------|--------|--------|--------|--------|--------|
| A-B    | C-D    | E-F    | G-H    | I-J    | K-L    | M-N    | O-P    |

A 0 bit may designate the first node in a pair, and a 1 bit may designate the second node in a pair. An eight-bit portion of a hash of the identity of an example data object may, for example, be:

10011100

Assuming the leftmost bit corresponds to Pair 1, data elements (replicas or shards) of this data object will be stored in nodes B, C, E, H, J, L, M, and O of the eight pairs. Since hashes of the identities of other data objects should generate relatively random combinations of bits, the data elements will tend to be relatively evenly distributed to the nodes in each pair, and to the nodes overall.

Note that the above scheme that uses a hash of the identity of an object to store data elements among pairs of nodes is given by way of example, and is not intended to be limiting. The identity of a data object, or a transformation thereof, may be used in other ways than those described to select among the nodes in a cohort for storing the data elements generated from the data object. For example, a hash or other transformation of an object ID may deterministically indicate a particular subset of M storage nodes in the cohort to which data elements generated from the respective data object are to be stored. Further note that, in addition to using the identity of a data object to select storage nodes in a cohort, in at least some embodiments the identity of data objects (e.g., a hash or other transformation of the identity of a data object) may be used in retrieving data objects from the cohort, for example in locating data element(s) (shards or replicas) of the data object that were previously stored in the cohort according to a hash of the identity.

Tagging Data Elements with Metadata

In at least some embodiments of an object-redundant storage system that implements volume cohorts, at least one of the M data elements generated from a data object stored to the set of M volumelets selected from the N volumelets in the cohort may be tagged with metadata that may be used by the storage service in locating others of the data elements generated from the data object and stored to the cohort. The metadata for a given data element on a given volumelet may indicate all of the locations (storage nodes/volumelets) in the cohort on which the data element is stored. When the storage service retrieves a data element from a volumelet, the metadata (if present) is also retrieved, and may then be used to retrieve others of the data elements if necessary.

While this tagging of the data elements in the cohort with metadata indicating locations may be done for data elements that are replicas in an object-redundant storage system using a replication technique, the metadata may be particularly useful for data elements that are shards generated from data objects according to a redundant encoding technique such as erasure encoding, since some minimum number R of the M shards generated for a data object (e.g., M/2 shards) are needed to recreate the data object. When the storage service retrieves a shard, the metadata is also retrieved if present, and may be used by the storage service to locate the other shard(s) needed to recreate the respective data object.

Figure 4A:
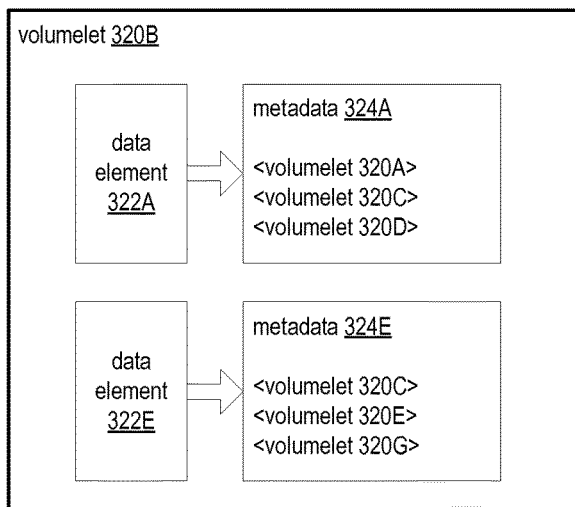
FIGS. 4A through 4C illustrate tagging data elements with metadata in a cohort, according to embodiments.
Figure 4B:
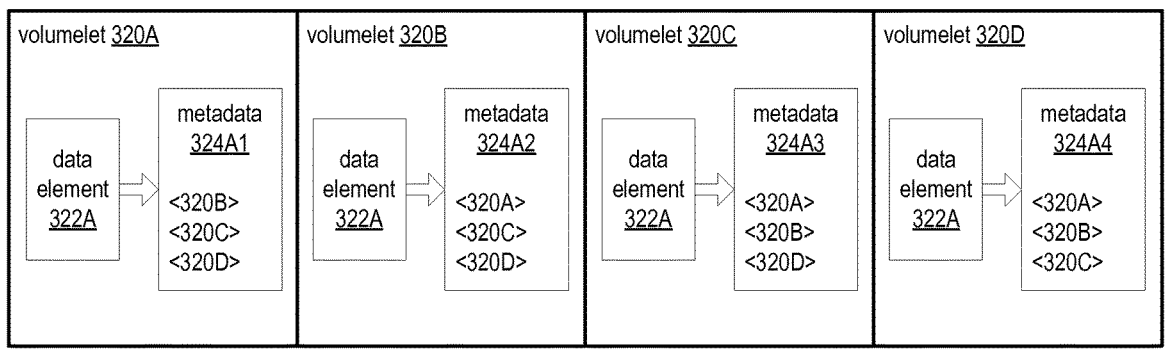
Figure 4C:
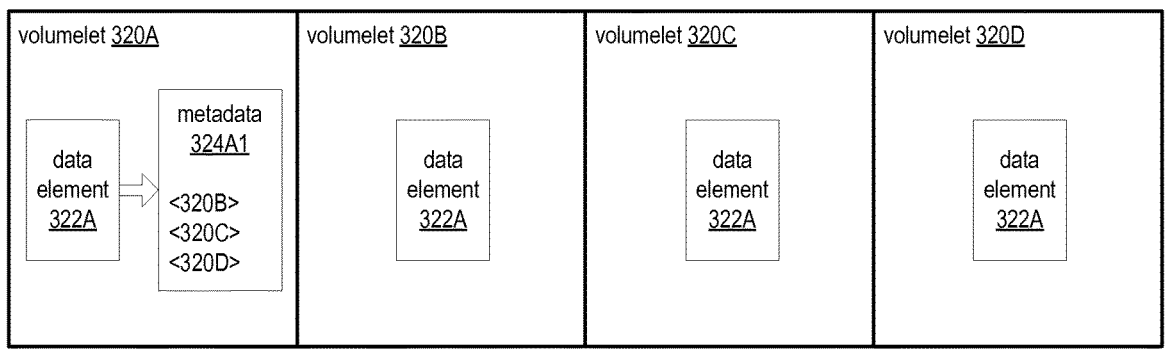

FIGS. 4A through 4C illustrate tagging data elements with metadata in a volume cohort, according to embodiments. These Figures use as an example the cohort 302B from FIG. 3B. In FIG. 4A, volumelet 320B from cohort 302B is shown. As shown in FIG. 3B, data elements 322A and 322E are stored on volumelet 320B. Data element 322A is tagged with metadata 324A that indicates that data element 322A is also located on volumelets 320A, 320C, and 320D. Data element 322E is tagged with metadata 324E that indicates that data element 322A is also located on volumelets 320C, 320E, and 320G. Note that, in some embodiments, for consistency, the metadata 324 for a given data element 322 on a volumelet 320 may also indicate that the data element 322 is stored on that volumelet 320; for example, metadata 324A may indicate that data element 322A is located on volumelets 320A, 320B, 320C, and 320D.

The metadata 324 for the data elements 322 may be stored in any of a number of forms or representations in various embodiments. However, in at least some embodiments, a compact form may be used to reduce storage and data retrieval overhead. As just one non-limiting example, a simple representation for the metadata 324 would be a bit field, where each bit corresponds to one of the storage nodes/volumelets in the cohort. For example, the metadata 324 for the example cohort 302B in FIG. 3B may be an eight-bit field, with the leftmost bit corresponding to volumelet 320A, and so on. Using this example representation, the metadata 324A for data element 322A may be represented as:

11110000 indicating that data element 322A is located on volumelets 320A, 320B, 320C, and 320D in cohort 302B. The metadata 324E for data element 322E may be represented as:

01101010 indicating that data element 322E is located on volumelets 320B, 320C, 320E, and 320G in cohort 302B.

In some embodiments, the metadata 324 may be stored with each data element 322 generated for a data object. FIG. 4B shows the first four volumelets 320A-320D of the cohort 302B of FIG. 3B, and shows that data element 322A, stored to each of volumelets 320A-320D, are tagged with respective metadata 324A1-324A4 that indicates, for each data element 322A, the other locations (e.g., other volumelets 320) on the cohort 302B at which the data element 322A is also stored. If any one of the data elements 322A is retrieved by the storage service, its corresponding metadata 324A is also retrieved, and may be used in locating and retrieving one or more of the other data elements 322A stored on the cohort 302B.

Note that, in embodiments in which the metadata 324 is stored with each data element 322 for a data object, for any given pair of volumelets 320, each volumelet 320 in the pair knows (or it can be determined from the metadata 324 on the volumelet 320) what data objects (a) have a data element 322 (shard or replica) stored in the volumelet 320 and (b) should have a data element 322 (shard or replica) stored on the other volumelet 320 in the pair. For example, in FIG. 4B, the fact that volumelet 320A should store a data element 322A can be determined from the metadata 324A2 on volumelet 320B, and the fact that volumelet 320B should have a data element 322A can be determined from the metadata 324A1 on volumelet 320A. This information may, for example, be used in a process of identifying data objects that are missing data elements (shards or replicas) in a cohort, and thus need to be repaired.

As an example of using the metadata in an object-redundant storage system in which M shards are generated from data objects according to a redundant encoding technique such as erasure encoding and stored to M of the N volumelets in a cohort along with metadata for each shard, a storage service may generate the M shards from a data object and randomly select M volumelets from among the N storage nodes/volumelets in the cohort that have enough available space to store a shard of the data object. When each shard is stored, the locations of all of the M shards in the cohort are stored with the shard as metadata, for example in a compact form. To retrieve a data object from the cohort, the storage service may access at least R of the N volumelets in the cohort requesting the data object (and providing identity information for the requested data object), where R is the minimum number of shards needed to recreate a data object according to the redundant encoding scheme being used. In some cases, all of the R nodes may return a shard, in which case the data object can be recreated from the retrieved shards and the retrieval is done. In other cases, none of the R nodes may return a shard, in which case a non-overlapping set of R nodes may be accessed by the storage service to request the data object. However, in most cases, one or more of the R nodes may indicate that they do not store a shard for the indicated data object, while one or more others of the R nodes may return the shard along with the metadata indicating the other locations in the cohort at which shards for the object are stored. If any (but not all) of the nodes do return a shard along with the metadata, then the storage service knows that it needs to access additional nodes in the cohort to obtain additional shards, and can use the returned metadata to intelligently select the nodes in the cohort to be accessed.

In some embodiments, instead of storing the metadata 324 with each data element 322 generated for a data object, only a subset of the data elements 322 generated for a data object may be tagged with metadata. FIG. 4C shows the first four volumelets 320A-320D of the cohort 302B of FIG. 3B, and shows that data element 322A is stored to each of volumelets 320A-320D. However, only the data element 322A stored on volumelet 320A is tagged with metadata 324A1 that indicates the other locations (e.g., other volumelets 320) on the cohort 302B at which the data element 322A is also stored. If data element 322A is retrieved from volumelet 320A by the storage service, its corresponding metadata 324A1 is also retrieved, and may be used in locating and retrieving one or more of the other data elements 322A stored on the cohort 302B.

As an example of an object-redundant storage system in which metadata is stored with only a portion of the M shards generated from a data object and stored to the cohort, a storage service may generate the M shards from a data object and randomly select M volumelets from among the N storage nodes/volumelets in the cohort that have enough available space to store a shard of the data object. The locations of all of the M shards in the cohort are stored with only a subset of the shards as metadata. As an example, in a cohort with 40 volumelets (N=40), where M=20, and R=10, the metadata may only be stored with 5 of the shards. To retrieve a data object from the example cohort, the storage service may access 20 of the N volumelets in the cohort requesting the data object. Since there are 5 volumelets that include a shard and the metadata that indicates the locations of all of the other shards, the probability that at least one of these 5 volumelets will be among the 20 volumelets that are accessed is about 98%. (As another example, with a sample size of 10 instead of 20, the probability that at least one of these 5 volumelets will be among the 10 volumelets that are accessed is about 78%). Thus, the metadata may be stored with only a subset of the volumelets while still providing a high probability that the metadata will be obtained on a first access, given a sufficient sample size. Once the storage service obtains the metadata, the service can use the metadata to intelligently select additional nodes in the cohort to be accessed to obtain additional shards if necessary.

Some embodiments may use a hybrid method for storing data elements to and retrieving data elements from a cohort that is a combination of a method for tagging data elements stored to a cohort with metadata for locating other data elements in the cohort and a method that uses the identity of data objects (or a transformation thereof) to select storage locations for data elements in a cohort. For example, a hash of a data object's identity may be used to select the volumelets for one or more data elements generated from a data object, while the volumelets for storing the other data elements may be randomly chosen. The metadata for locating all of the data elements may be stored with the data elements for which the location is determined according to the hash of the identity. Thus, when retrieving a data object, a hash of the identity may direct the storage service to the location of one or more of the data elements for which metadata is stored, and the retrieved metadata may be used in intelligently retrieving additional data elements for the data object if necessary.

Figure 5:
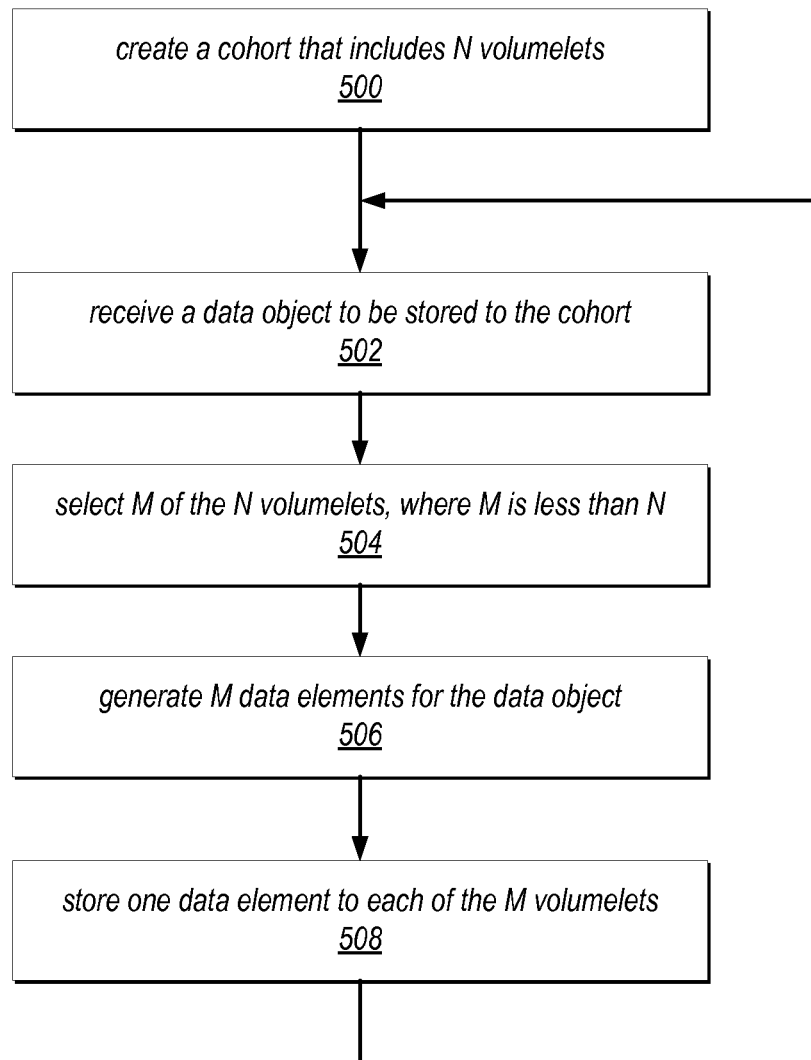
FIG. 5 is a high-level flowchart of a method for creating and storing data objects to a cohort in an object redundant storage system, according to at least some embodiments.
Figure 13:
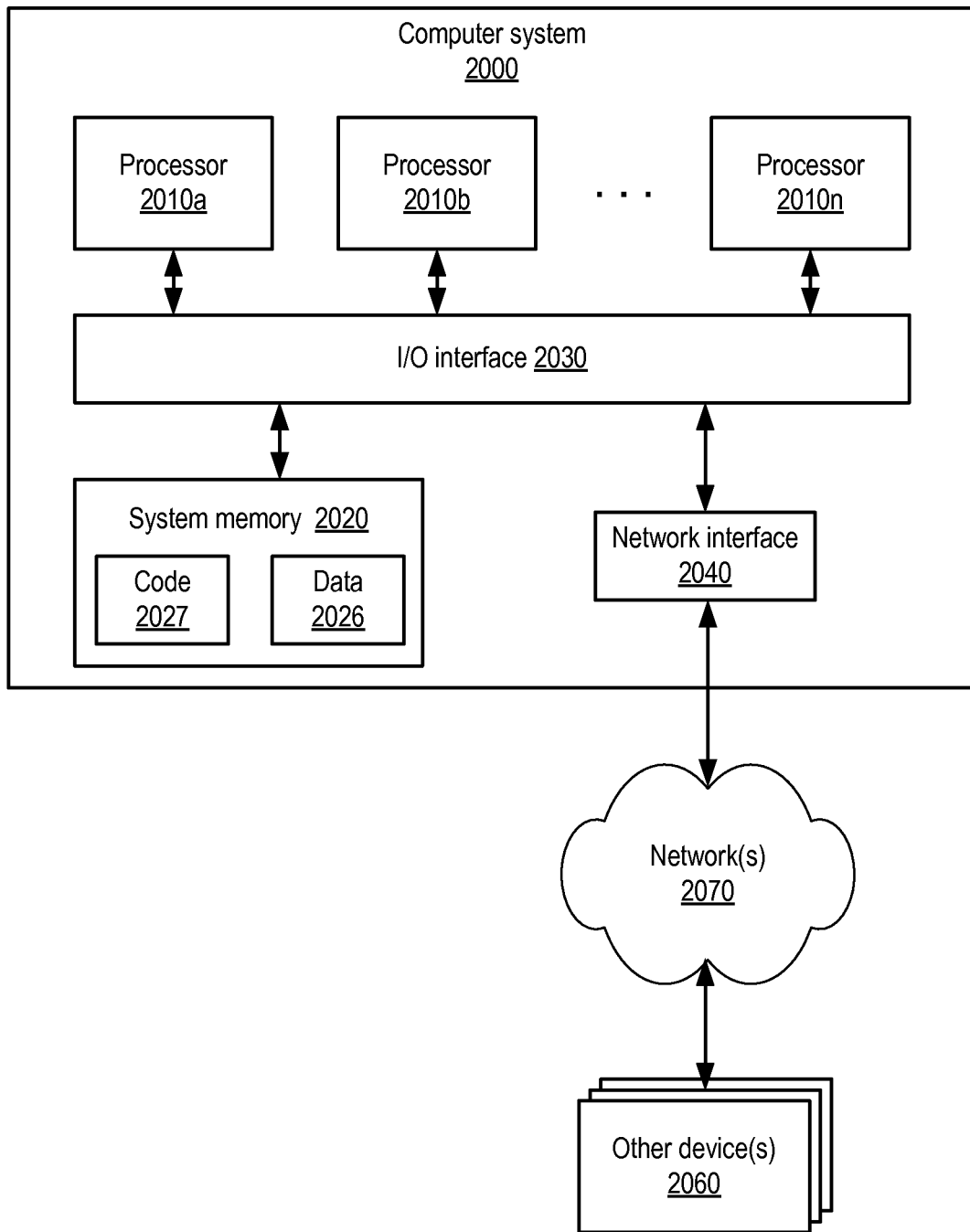
FIG. 13 is a block diagram illustrating an example computer system that may be used in some embodiments.

FIG. 5 is a high-level flowchart of a method for creating and storing data objects to a cohort in an object redundant storage system according to at least some embodiments. The method may, for example, be performed by or via a storage service implemented on one or more devices. An example system on which embodiments of a storage service may be implemented is shown in FIG. 13.

As indicated at 500, a cohort that includes N volumelets may be created. In at least some embodiments, each of the N volumelets may reside on a different storage node or device. In some embodiments, the cohort may be initialized by storing a base or initial set of data objects to the cohort. As indicated at 502, a data object to be stored to the cohort may be received, for example from one of one or more clients of the storage service.

As indicated at 504, the storage service may select M of the N volumelets to which the data object is to be stored, where M is less than N. In embodiments, different techniques may be used to select the M volumelets. For example, in some embodiments, a random or pseudo-random selection technique may be used. In some embodiments, one or more factors, such as available storage space, may be considered when selecting the M volumelets. In some embodiments, an identity of the data object (or a transformation thereof, such as a hash) may be used in determining at least some of the M volumelets. Combinations or variations of these techniques may be used in some embodiments.

As indicated at 506, M data elements may be generated for or from the data object. The data elements may, for example, be replicas of the data object generated according to a replication technique. Alternatively, the data elements may be shards of the data object generated according to a redundant encoding scheme such as erasure encoding.

As indicated at 508, one of the M data elements may be stored to each of the M selected volumelets in the cohort. In at least some embodiments, metadata indicating the storage location (e.g., volumelet) of at least one other of the M data elements may be stored with at least one of the M data elements. In some embodiments, the metadata is stored with each of the M data elements in the cohort.

Figure 6:
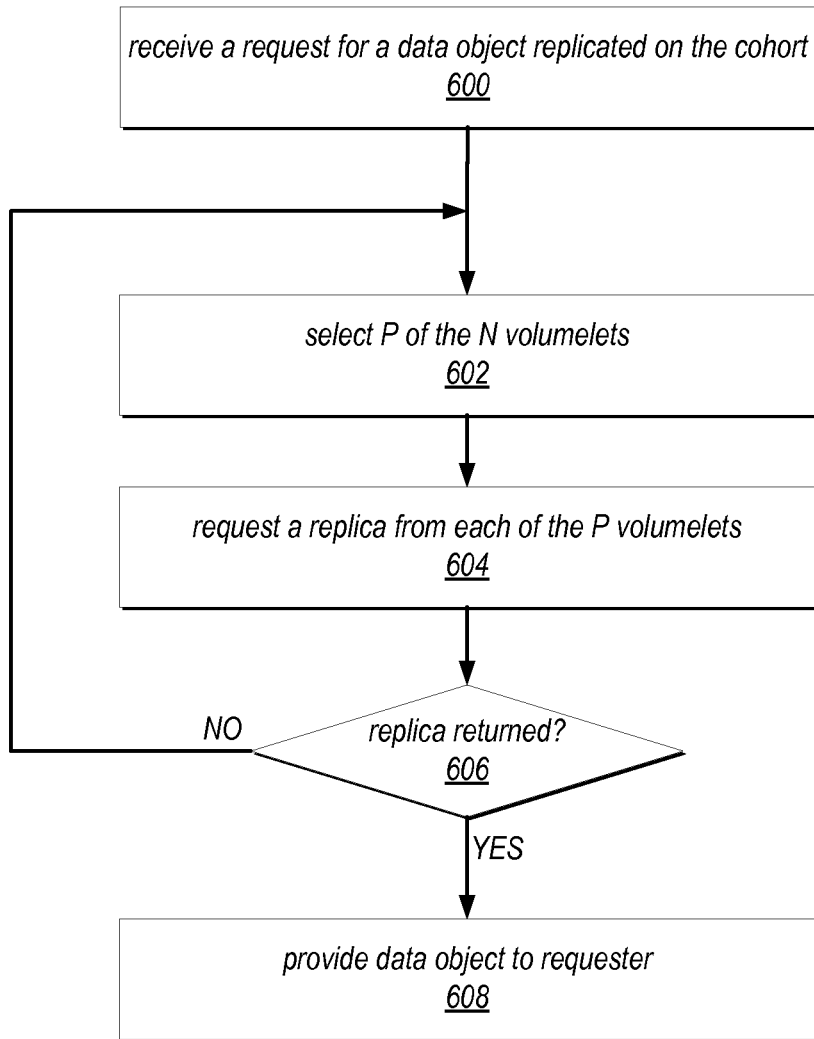
FIG. 6 is a high-level flowchart of a method for retrieving data objects from a cohort in which the data objects are stored according to a replication technique, according to at least some embodiments.

FIG. 6 is a high-level flowchart of a method for retrieving data objects from a cohort in which the data objects are stored according to a replication technique, according to at least some embodiments. The method may, for example, be performed by or via a storage service implemented on one or more devices. An example system on which embodiments of a storage service may be implemented is shown in FIG. 13. Note that, in a replication technique, only one replica needs to be retrieved from the cohort to retrieve the data object.

As indicated at 600, a request for a data object stored to the cohort may be received, for example from one of one or more clients of the storage service. The data object may have been previously stored to the cohort according to a replication technique that generates M replicas of the data object and stores one of the replicas to each of M volumelets selected from the N volumelets in the cohort.

As indicated at 602, P of the N volumelets in the cohort may be selected. Different techniques may be used to select the P volumelets. For example, in some embodiments, a random or pseudo-random selection technique may be used. In some embodiments, an identity of the data object (or a transformation thereof, such as a hash) may be used in determining at least some of the P volumelets. Note that, generally, P may be equal to or less than M. However, P could be any number from 1 up to and including N.

As indicated at 604, a replica of the data object may be requested from each of the selected P volumelets. At 606, if a replica is returned from at least one of the P volumelets, then the data object may be provided to the requestor as indicated at 608. Otherwise, at 604, the method may return to 602 and select a non-overlapping set of P (or some other number of) volumelets and request the data object from the new set of volumelet(s).

Figure 7:
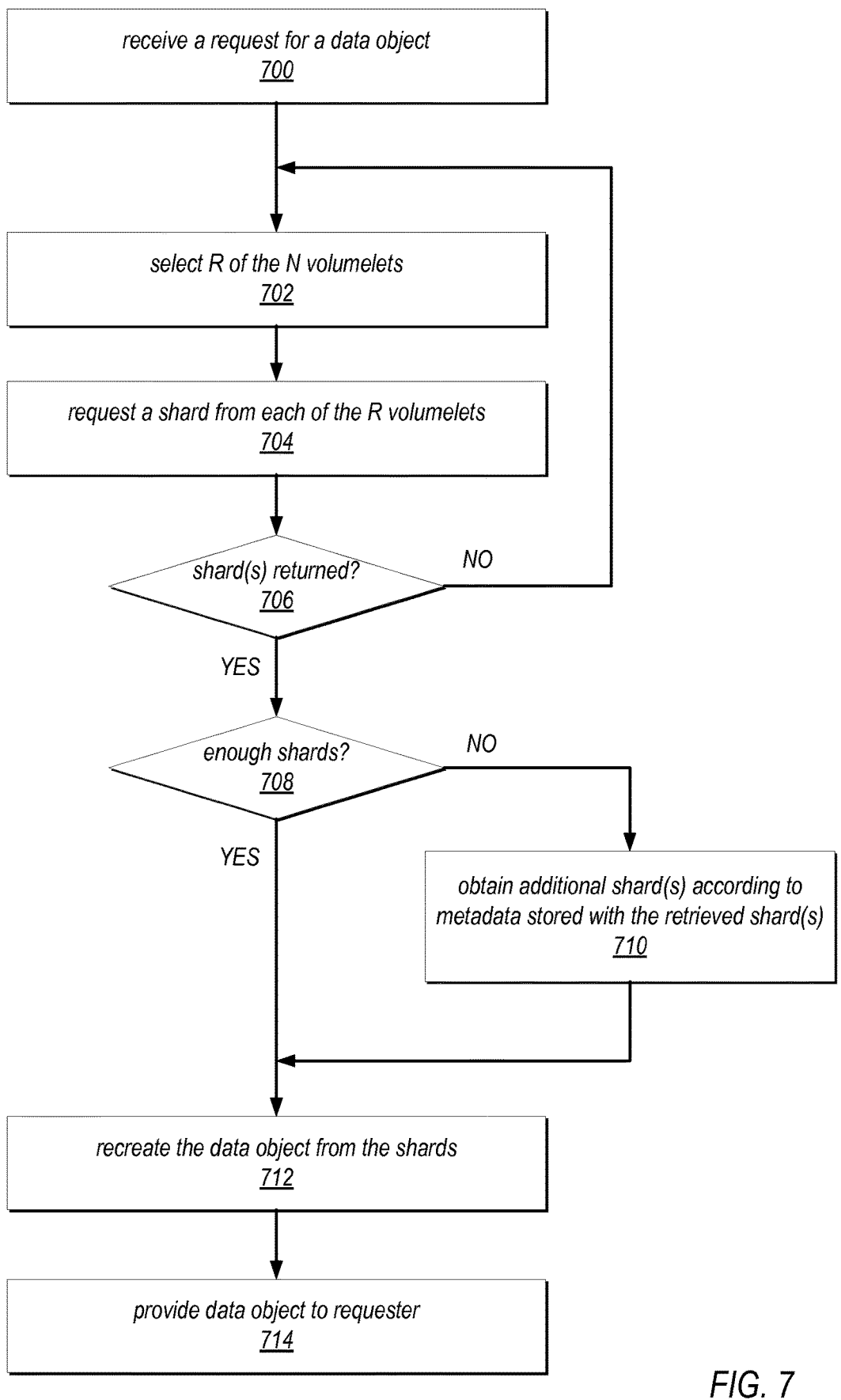
FIG. 7 is a high-level flowchart of a method for retrieving data objects from a cohort in which the data objects are stored according to a redundant encoding technique, according to at least some embodiments.

FIG. 7 is a high-level flowchart of a method for retrieving data objects from a cohort in which the data objects are stored according to a redundant encoding technique, according to at least some embodiments. The method may, for example, be performed by or via a storage service implemented on one or more devices. An example system on which embodiments of a storage service may be implemented is shown in FIG. 13. Note that, in a redundant encoding technique, some minimum number of the shards created from a data object is required to recreate the data object. In this document, R is used to represent the minimum number of shards needed to recreate a data object, while M is used to represent the total number of shards created from a data object and stored to a subset of M volumelets selected from the N volumelets in a cohort. Note that generally but not necessarily, R=M/2. For example, in a non-limiting example erasure encoding scheme, M=20, and R=10.

As indicated at 700, a request for a data object stored to the cohort may be received, for example from one of one or more clients of the storage service. The data object may have been previously stored to the cohort according to a redundant encoding technique that generates M shards of the data object and stores one of the shards to each of M volumelets selected from the N volumelets in the cohort.

As indicated at 702, R of the N volumelets in the cohort may be selected. Different techniques may be used to select the R volumelets. For example, in some embodiments, a random or pseudo-random selection technique may be used. In some embodiments, an identity of the data object (or a transformation thereof, such as a hash) may be used in determining at least some of the R volumelets. Note that, in this example implementation, R is the minimum number of shards needed to recreate a data object according to the redundant encoding scheme being used, and thus R volumelets are at least initially selected to query for shards. However, more than or fewer than R volumelets may be selected to query in other implementations.

As indicated at 704, a shard of the data object may be requested from each of the selected R volumelets. Each of the queried R volumelets either does or does not store a shard for the data object. If one of the queried R volumelets has a shard for the data object, the volumelet returns the shard. If the volumelet also stores metadata for locating other shards in the cohort, the metadata may also be returned.

At 706, if no shards are returned from the selected R volumelets, then the method may return to 702, select a non-overlapping set of R (or some other number of) volumelets, and query the new set of volumelet(s) for the data object.

At 706, if at least one shard is returned from the selected R volumelets, then the storage service may determine if enough shards (i.e., at least R shards, where R is the minimum number of shards needed to recreate a data object according to the redundant encoding scheme being used) have been obtained to recreate the data object. At 708, if enough shards (i.e., at least R shards) have been obtained, then the method proceeds to 712.

At 708, if at least one but not enough (i.e., fewer than R) shards have been obtained, then in at least some embodiments the storage service may obtain one or additional shards from other volumelets in the cohort; the other volumelets may be located by the storage service according to the metadata that was stored with at least one of the retrieved shards and returned to the storage service with the shard(s) obtained from the R queried volumelets. Note that this metadata stored with a given one of the shards indicates the location in the cohort of at least one other shard, and in some embodiments indicates the location of every shard.

Alternatively, instead of using metadata retrieved with shard(s) to locate additional shards as indicated at 710, in some embodiments the method may instead return to 702, select a non-overlapping set of R (or some other number of) volumelets, and query the new set of volumelet(s) to retrieve additional shard(s).

At 712, once at least R shards have been retrieved from the cohort, then the data object may be recreated from the retrieved shards according to the redundant encoding scheme being used, for example an erasure encoding scheme. The recreated data object may then be provided to the requester, for example one of one or more clients of the storage service.

Reconciling Volumelets in Volume Cohorts

Various embodiments of methods and apparatus for reconciling the volumelets of volume cohorts in object-redundant storage systems are described. In object-redundant storage systems that use cohorts as described in reference to FIGS. 2A through 7, as in an object-redundant storage system that uses groups of storage nodes as illustrated in FIG. 1, it may be necessary or desirable to periodically compare the contents of the volumelets within a volume, for example as part of a reconciliation process that ensures that the data elements (replicas or shards) for the data objects are actually stored to all of the volumelets in the set of volumelets to which the data elements are supposed to be stored. In the storage system of FIG. 1, this set includes all m volumelets 120 in the volume 102, as a replica or shard of each data object should be stored to each volumelet in the group, and each volumelet in the group should include identical content. In the storage system that uses volume cohorts as described in reference to FIGS. 2A through 7, however, for each data object, the set includes the M volumelets 220 selected from among the N volumelets 220 in the cohort 202 to which the data elements (replicas or shards) for this particular data object are to be stored. Note that the content of any two given volumelets in a cohort will thus typically not be identical.

In either type of object-redundant storage system, this comparison of the contents of volumelets could be performed by downloading a complete inventory or list of the contents of each volumelet to a central location or system and having the central system do the comparison. However, the downloading of complete and detailed lists from all of the volumelets to a central location would use a significant amount of network bandwidth.

Various techniques may be employed to reduce the network bandwidth use when comparing and reconciling volumelets in object-redundant storage systems. For example, in an object-redundant storage system in which the content of every volumelet in the volume should be identical as illustrated in FIG. 1, a hash technique may be used. For example a hash tree technique may be used in which each volumelet in the group takes a list of identifiers of the data objects stored in that volumelet (referred to as object IDs), splits the list of object IDs into sublists, for example based on a hash or other transformation of the object ID, generates a hash for each (sorted) sublist, and then hashes these hashes to generate a root hash. The resulting root hash from each volumelet is sent to a central location or system. At the central system, if all volumelets report the same root hash, no further reconciliation is needed. If the root hashes for two or more volumelets differ, then the sublist hashes may be compared to identify differing sublist hashes. Differing sublist hashes may be used to identify sublists of data objects from the volumelets that are different according to the levels of the hash tree. Once the differing sublists of data objects are identified, lists of object IDs for just the differing sublists may be downloaded to the central system and compared to identify set(s) of data objects that require reconciliation (e.g., replication or erasure encoding reconstruction) in the volume.

However, in an object-redundant storage system that uses volume cohorts as described in reference to FIGS. 2A through 7, each volumelet will generally include a unique set of data objects, and thus the hash tree technique as described above in reference to FIG. 1 would not work, as the root hashes of any two given volumelets in a cohort will typically be different.

Embodiments of methods for comparing and reconciling the volumelets of volume cohorts in object-redundant storage systems are described that allow relatively small hashes to be used to perform comparison and reconciliation in the storage system and to thus save network bandwidth during the comparison and reconciliation process. In some embodiments, these methods may leverage the metadata 324 that is stored with the data elements in each of the volumelets, for example as illustrated in FIGS. 4A and 4B. Referring to FIGS. 3A, 3B, 4A, and 4B, the metadata 324 for a given data element 322 indicates all of the volumelets 320 in the cohort 302B to which data elements for the respective data object are (or should be) stored. Via this metadata 324, when stored with every data element 322 as shown in FIG. 4B, the full set of M volumelets 320 (out of the N volumelets in a cohort) to which a given data object belongs (and thus to which a data element for the object should be stored) is known to, or can be determined by, every volumelet 320 that owns that particular data object.

In some embodiments, instead of leveraging metadata stored with the data elements to determine common object lists with other volumelets, a volumelet may use the identities of the data objects (e.g., object IDs) to determine the common object lists. For example, a hash or other transformation of the object ID associated with a given data element may be used to deterministically indicate subsets of M storage nodes in the cohort to which the data elements generated from the respective data object are stored. A storage node/volumelet may thus apply this transformation to the object IDs of the data objects for which it stores a data element to determine the other storage nodes/volumelets on which the data objects should also be stored.

Figure 8:
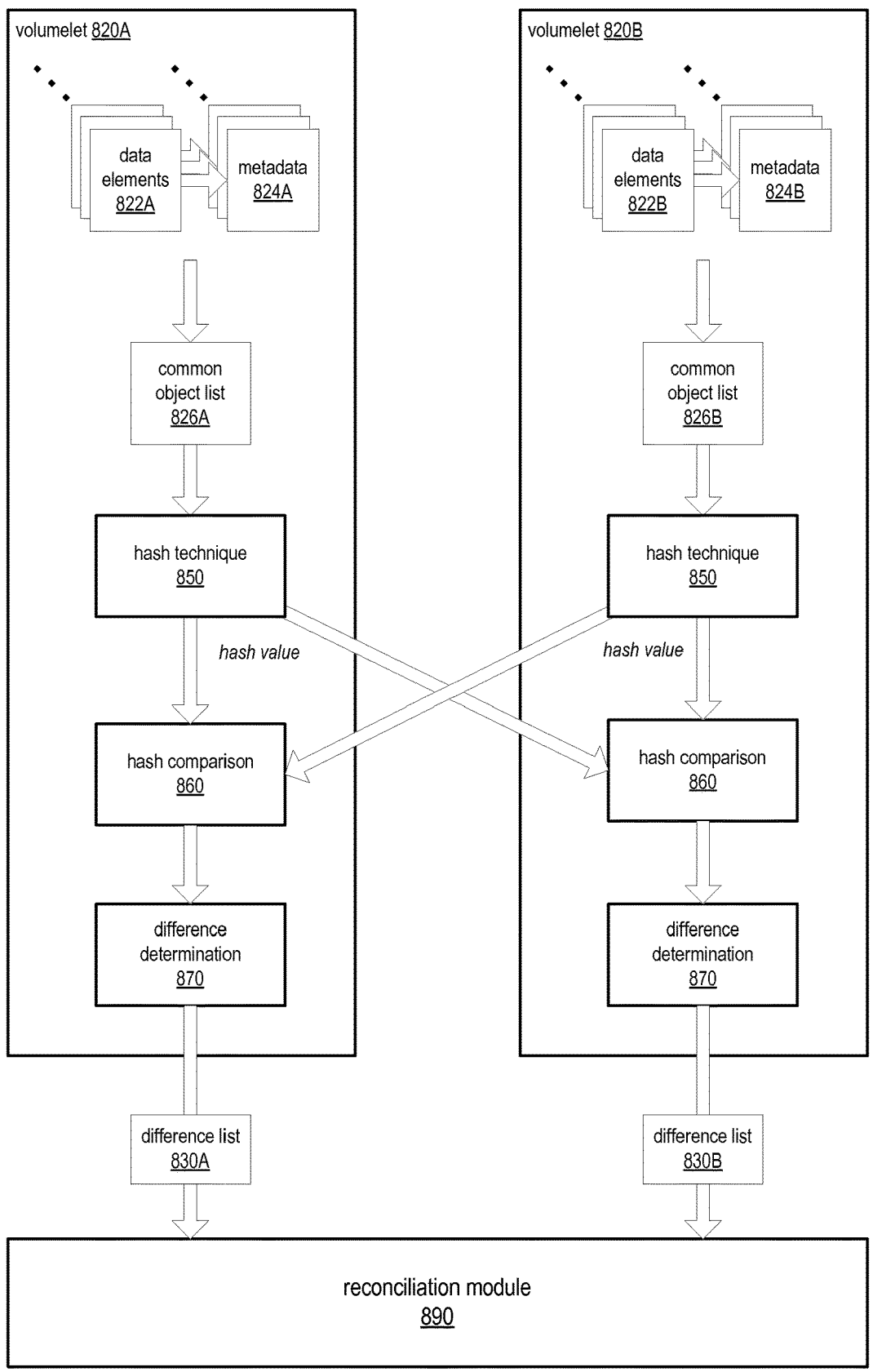
FIG. 8 graphically illustrates a method for comparing the volumelets of a cohort as part of a reconciliation process on an object-redundant storage system, according to at least some embodiments.

FIG. 8 graphically illustrates a method for comparing the volumelets of a cohort as part of a reconciliation process on an object-redundant storage system, according to at least some embodiments. This method may, for example, be implemented in an object-redundant storage system 200 as illustrated in FIG. 2A. Referring to FIG. 8, the method may be viewed as a "gossip" method in which each volumelet 820 in the cohort communicates with each other volumelet 820 in the cohort to compare the content (common object lists 826) that each pair of volumelets 820 should have in common, and then communicates any detected differences 830 to a central location as illustrated by reconciliation module 890. The reconciliation module 890 collects the differences 830 from the volumelets 820 and uses the collected information to perform replication of data elements as necessary in a storage system that uses a replication technique for object redundancy, or to perform redundant code (shard) reconstruction as necessary in a storage system that uses a redundant encoding technique such as erasure encoding. Note that, in at least some embodiments, reconciliation module 890 may implement at least part of a reconciliation process, and may be a component, module, or part of a storage system 200 and/or storage service 250 as illustrated in FIG. 2A.

In embodiments of the volumelet comparison method, each volumelet 820 in a cohort periodically or aperiodically communicates with each other volumelet 820 in the cohort to compare volumelet contents. FIG. 8 illustrates this process for two example volumelets 820A and 820B. Volumelet 820A includes a set of data elements 822A (shards or replicas) with associated metadata 824A. Volumelet 820B includes a set of data elements 822B (shards or replicas) with associated metadata 824B. In a cohort storage system, generally, the sets of data elements 822 in any two volumelets 820 overlap to some extent, but are not identical. In other words, the two volumelets 820 each contain some data elements generated from the same set of data objects, but both volumelets 820 also contain other data elements for other data objects that are not shared with the other volumelet. In some embodiments, since the metadata 824 on each volumelet 820 indicates, for each data element 822, the complete set of M volumelets 820 on which data elements 822 for the respective data object should be stored, a given volumelet 820 may contain or may generate a list of data objects (common object list 826) that it has (or should have) in common with any other volumelet 820 in the cohort according to the metadata 824. Alternatively, each volumelet 820 may apply a transformation (e.g., a hash) to the object IDs of the data elements 822 it stores to determine the other volumelets 820 on which each data element 822 should also be stored, and may use this information to generate common object list 826.

As illustrated in FIG. 8, volumelet 820A contains or generates a common object list 826A that lists all of the data objects that it has, or that it should have, in common with volumelet 820B. Similarly, volumelet 820B contains or generates a common object list 826B that lists all of the data objects that it has, or that it should have, in common with volumelet 820A. In at least some embodiments, each data object may be indicated by an object identifier (object ID) that may uniquely identify the data object in the storage system. The object IDs may be of any suitable type (alphanumeric string, numeric, etc.) and of any suitable length or size (32-bit, 64-bit, 128-bit, etc.). In at least some embodiments, the object IDs in lists 826A and 826B may be ordered according to a same ordering scheme such that, given that the two lists 826 contain exactly the same set of object IDs, the two lists 826 are identical. However, the lists 826A may at least initially be unordered, with ordering of the object IDs being performed during a hash technique as described below.

Each volumelet 820 then applies a hash technique 850 to its respective common object list 826 to generate a hash value for the list 826. Note that both volumelets 820 use essentially the same hash technique 850 so that, if the two lists 826 are identical, the hash values will be identical.

In at least some embodiments, hash technique 850 may be a hash tree technique. In at least some embodiments of a hash tree technique, the common object list 826 is split into two or more sorted sublists, for example based on a hash or other transformation of the object ID. Hashes are generated from each sublist. In some embodiments, a hash may be generated for each object ID in a sublist. Alternatively, two or more object IDs may be combined, and a hash may be generated for each such combination of two or more object IDs in the sublist. For each sublist, the hashes may be combined and hashed to generate sublist hashes. The sublist hashes may then combined (e.g., concatenated) and hashed to generate a root hash for the common object list 826. In some embodiments, instead of or in addition to object IDs, other information about the data objects than the object IDs may be used in the hash technique.

Figure 12:
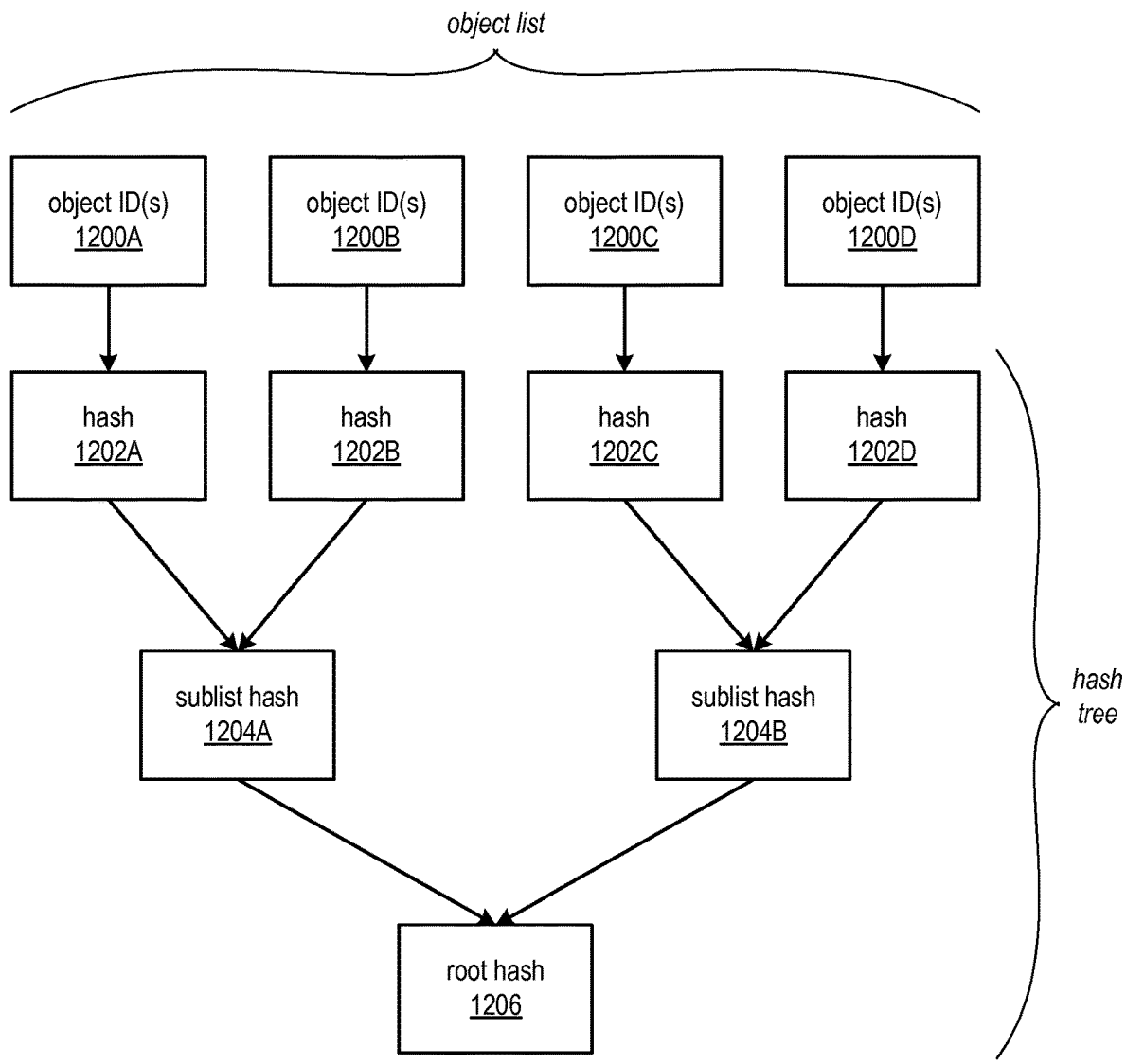
FIG. 12 illustrates an example hash tree according to at least some embodiments.

FIG. 12 illustrates a non-limiting example hash tree generated from a set of object identifiers (object IDs) 1200 (e.g., an object list) that shows hashes 1202 generated from the object IDs 1200, sublist hashes 1204 generated as a hash of sets of the object ID hashes 1202, and a root hash 1206 generated as a hash of the sublist hashes 1204. While FIG. 12 shows an example hash tree with three levels, note that in some embodiments there may be more levels in the hash tree. In some embodiments, a hash 1202 may be generated for each object ID 1200. Alternatively, two or more object IDs may be combined, and a hash 1202 may be generated for each such combination of two or more object IDs. For example, there may be an additional hash tree level between hashes 1202 and sublist hashes 1204 at which two or more hashes 1202 are combined and hashed to generate an intermediate level hash; the intermediate level hashes may then be combined and hashed to generate sublist hashes 1204.

Referring again to FIG. 8, after the root hashes are generated for the common object lists 826, the two volumelets 820 exchange the generated hash values (the root hashes for the common object lists 826). On each volumelet 820, a hash comparison 860 function or module compares the two hash values for the two common object lists 826.

If the two hash values are the same, then the two common object lists 826 are the same, and the two volumelets 820 are assumed to have the correct overlapping set of data objects. If this is the case, then the two volumelets 820 are done with the comparison. However, note that the two volumelets 820 may periodically or aperiodically repeat the comparison. Note that, in some embodiments, a volumelet 820 may notify a central system or location such as reconciliation module 890 to inform the module 890 that a check has been run with a given other volumelet 820 and that the two volumelets 820 have the correct overlapping set of data objects.

If the two hash values are not the same, then there is some difference between the two object lists 826. Each volumelet 820 may then perform a difference determination 870 for the common object lists 826 to determine one or more object IDs for data objects that should be but are not on both volumelets 820. In at least some embodiments, the hash trees generated by the hash technique 850 on the two volumelets may be used to determine the specific differences. For example, in some embodiments, the sublist hashes of the two hash trees may be compared to determine particular sublist(s) of object IDs that are different, and the identified sublist(s) can then be compared to determine differences.

In at least some embodiments, results of the difference determination 870 on both volumelets 820A and 820B may be sent to a central system or location such as reconciliation module 890 as difference lists 830A and 830B, respectively. In at least some embodiments, each difference list 830 may indicate the two volumelets 820 for which the list 830 was generated, and that may list one or more object IDs for data objects that should be but are not on both of the identified volumelets 820.

In at least some embodiments, each of the volumelets 820 in the cohort periodically or aperiodically performs the above comparison method with each other volumelet 820 in the cohort. Thus, in some embodiments, each volumelet 820 may send one, two, or more difference lists 830 specific to its comparison to a particular other volumelet to reconciliation module 890. Alternatively, a volumelet 820 may perform comparisons with two or more other volumelets 820, collect the detected differences, and periodically or aperiodically sends a combined difference list 830 to the reconciliation module 890 that indicates differences between this volumelet 820 and two or more other volumelets 820.

The central system or location (e.g., reconciliation module 890) collects difference lists 830 from some or all of the N volumelets 820 in the cohort. Periodically or aperiodically, or as needed or desired, the reconciliation module 890 may perform reconciliation on one, two, or more of the volumelets 820 in the cohort to reconcile the data objects actually on the volumelet(s) with the set of data objects that should be on the volumelet(s) 820 as determined according to the comparisons performed among the volumelets 820. Reconciliation may involve replication of data object to one or more volumelets 820 in storage systems that use a replication technique, or may involve the regeneration of shards for data objects in storage systems that use a redundant encoding technique such as erasure encoding.

Note that a central system or location such as reconciliation module 890 may primarily be needed in storage systems that use a redundant encoding technique to recover or reconstruct shards for data objects stored in a cohort. While a central reconciliation module 890 may be used in storage systems that use a replication technique, as an alternative in such systems, two volumelets 820 may perform a comparison as illustrated in FIG. 8 to determine missing replica(s) on one of the volumelets 820, and the other volumelet 820 may then provide the missing replica(s) directly to the first volumelet 820.

In some embodiments, instead of using a hash tree technique as the hash technique 850 in FIG. 8, a comparatively simple hash or other transformation of the common objects lists 826 may be generated and exchanged by the volumelets 820. While this may simplify the process of generating hashes, the levels of the hash tree are not available to use during difference determination 870 if the generated hash values are different, and thus more information may need to be exchanged to determine the differences between the two volumelets 820.

In some embodiments, as an alternative to or variation on the method for comparing the volumelets of a cohort as part of a reconciliation process on an object-redundant storage system as illustrated in FIG. 8, each volumelet 820 may generate common object lists 826, generate hash values (e.g., root hashes) for the lists 826, exchange hash values (e.g., root hashes) with other volumelet(s) 820, and compare the hash values (e.g., root hashes) as illustrated in FIG. 8. However, instead of performing difference determination 870 at the volumelet(s) 820 and reporting the determined differences, if any, to the reconciliation module 890 as shown in FIG. 8, each volumelet 820 instead reports to the reconciliation module 890 that the hash value (e.g., root hash) for a common object list does not match the respective hash value received from another volumelet 820. The reconciliation module 890 then performs difference determination as necessary to determine the specific differences between the two volumelets 820 that may need reconciliation. Note that this may require the reconciliation module 890 to request additional information from the volumelet(s) 820.

Figure 10:
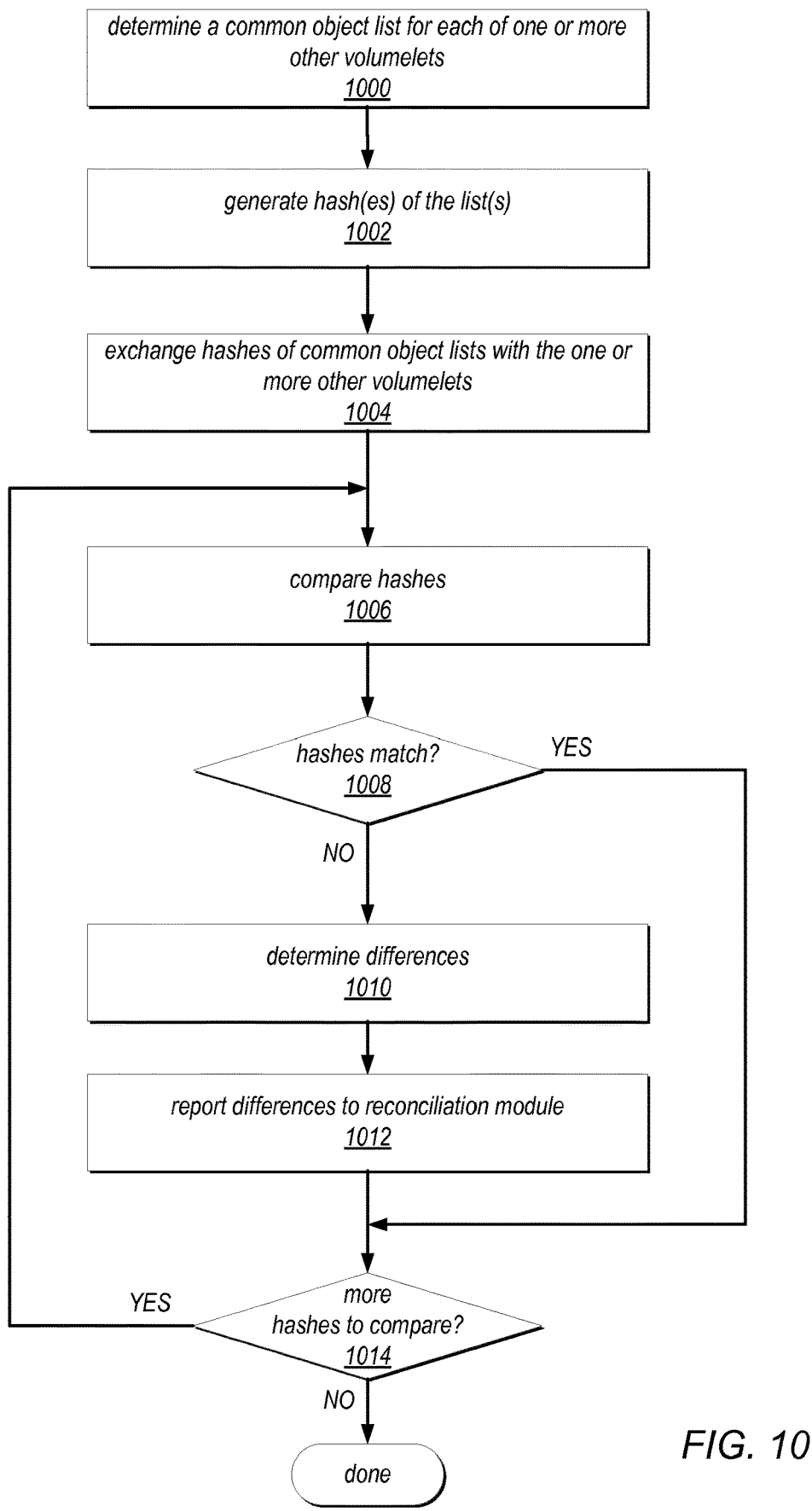
FIG. 10 is a flowchart of a method for comparing the volumelets of a cohort as part of a reconciliation process on an object-redundant storage system, according to at least some embodiments.

FIG. 10 is a flowchart of a method for comparing the volumelets of a cohort as part of a reconciliation process on an object-redundant storage system, according to at least some embodiments. This method may, for example, be performed on a storage node and/or volumelet as shown in an object-redundant storage system 200 as illustrated in FIG. 2A. This method may be viewed as a "gossip" method in which each volumelet in a cohort communicates with each other volumelet in the cohort to compare the content that each pair of volumelets should have in common, and then communicates any detected differences to a central location such as a reconciliation module. The central location collects the differences from the volumelets and uses the collected information to perform replication of data elements as necessary in a storage system that uses a replication technique for object redundancy, or to perform shard reconstruction as necessary in a storage system that uses a redundant encoding technique such as erasure encoding.

As indicated at 1000 of FIG. 10, a volumelet may determine or generate a common object list for each of one or more other volumelets in a cohort. A common object list for a given one of the other volumelets indicates the data objects that this volumelet has, or should have, in common with the other volumelet. In at least some embodiments, each data object may be indicated in the list by an object identifier (object ID).

As indicated at 1002, the volumelet may generate hash(es) of the common object list(s). In at least some embodiments, a hash tree technique as described in reference to FIG. 8 may be used to generate the hash values (i.e., root hashes) for the common object list(s). However, other hash techniques may be used in some embodiments.

As indicated at 1004, the volumelet may exchange hashes of common object lists with each of the one or more other volumelets. Elements 1006 through 1014 may then be performed for each other volumelet with which hashes were exchanged at 1004.

At 1006, the hash value generated for the common object list of a particular one of the one or more other volumelets may be compared with the hash value received from the particular other volumelet. At 1008, if the two hashes match, then the two volumelets are consistent, and the method jumps to 1014. At 1008, if the two hashes do not match, then differences between the common object lists on the two volumelets may be determined at 1010. In at least some embodiments, determining the differences involves determining one or more object IDs for data objects that should be but are not on both volumelets. In at least some embodiments, hash trees generated by a hash tree technique on the two volumelets may be used to determine the specific differences between the volumelets. For example, in some embodiments, hash values at one or more different levels of the two hash trees may be compared to determine particular sublist(s) of object IDs that are different, and the identified sublist(s) can then be compared to determine specific differences.

As indicated at 1012, any differences determined at 1010 may be reported to a central location such as a reconciliation module. In at least some embodiments, a difference list is sent to the central location that may indicate the two volumelets for which the list was generated, and that may list one or more object IDs for data objects that should be but are not on both of the identified volumelets.

At 1014, if there are any more hashes to be compared, then the method may return to element 1006. Otherwise, the comparison method is done on this volumelet until the next time the method is invoked.

Figure 9:
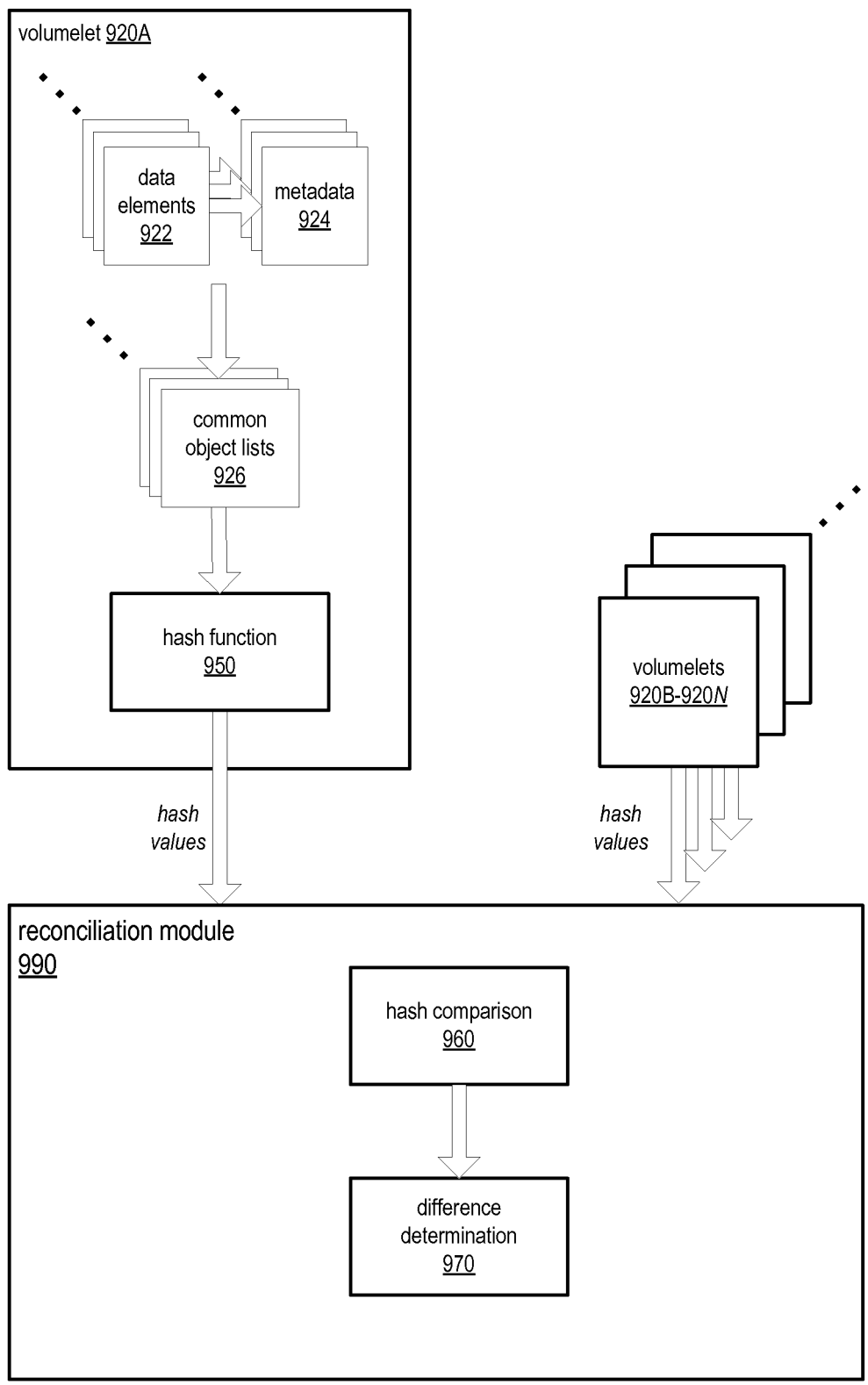
FIG. 9 graphically illustrates an alternative method for comparing the volumelets of a cohort as part of a reconciliation process on an object-redundant storage system, according to at least some embodiments.

FIG. 9 graphically illustrates an alternative method for comparing the volumelets of a cohort as part of a reconciliation process on an object-redundant storage system, according to at least some embodiments. This alternative method may, for example, be implemented in an object-redundant storage system 200 as illustrated in FIG. 2A. Referring to FIG. 9, instead of employing a "gossip" method as shown in FIG. 8 in which each volumelet in the cohort communicates with each other volumelet in the cohort to determine differences between the volumelets which are then communicated to a central location such as a reconciliation module, each volumelet 920 periodically or aperiodically generates a set of two or more common object lists 926, with each common object list 926 corresponding to one of the other volumelets 920 in the cohort. A hash function 950 is then applied to each common object list 926, and the hash values are provided to a central location such as reconciliation module 990.

In at least some embodiments, a common object list 926 is generated on each volumelet 920 in the cohort for each of the other N volumelets 920 in the cohort, hash values are generated for each common object list 926 on each of the N volumelets 920, and all of the hash values are provided to the reconciliation module 990.

FIG. 9 shows volumelet 920A as an example. From volumelet 920A's elements 922 and metadata 924, a set of common object lists 926 may be generated, with one common object list 926 for each other volumelet 920 in the cohort. Alternatively, volumelet 920A may apply a transformation (e.g., a hash) to the object IDs of the data elements 922 it stores to determine the other volumelets 920 on which each data element 922 should also be stored, and may use this information to generate common object lists 926. A hash function 950 is applied to each common object list 926, and the resulting hash values are sent to reconciliation module 990. In at least some embodiments, a hash tree technique as described in reference to FIG. 8 may be used to generate the hash values for the common object lists 926. However, other hash techniques may be used in some embodiments.

Each of the other volumelets 920B-920N in the cohort may perform a similar method as shown for volumelet 920A to provide hash values for their common objects lists to the reconciliation module 990.

As shown in FIG. 9, reconciliation module 990 may locally perform the hash comparison 960 of the hash values received from the volumelets 920, and may perform difference determination 970 for any two volumelets 920 that are determined to have different hash values for their respective common object lists 926. Difference determination 970 may be performed for a given two volumelets 920 to determine one or more object IDs for data objects that should be but are not on both volumelets 920. In at least some embodiments, to perform difference determination 970, reconciliation module 990 may request additional hash information (e.g., sublist hashes) and/or additional object ID information (e.g., lists or partial lists of object IDs) from one or both volumelets 920. As an alternative, in some embodiments, if reconciliation module 990 detects different hash values for two volumelets 920, the reconciliation module 990 may request that one or both of the volumelets 920 perform at least some of the difference determination.

According to results of hash comparison 960 and difference determination 970, the reconciliation module 990 may perform reconciliation on one, two, or more of the volumelets 920 in the cohort to reconcile the data objects actually on the volumelet(s) with the set of data objects that should be on the volumelet(s) 920 as determined according to the comparison method as illustrated in FIG. 9.

Figure 11A:
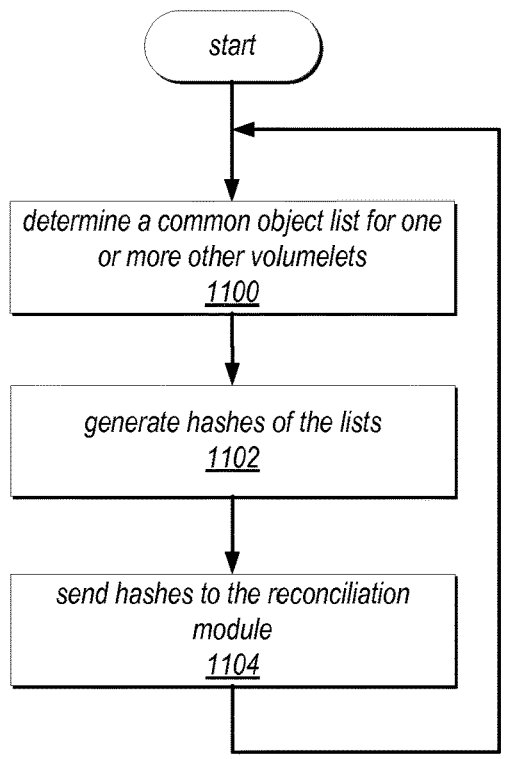
FIGS. 11A through 11C are flowcharts of an alternative method for comparing the volumelets of a cohort as part of a reconciliation process on an object-redundant storage system, according to at least some embodiments.
Figure 11B:
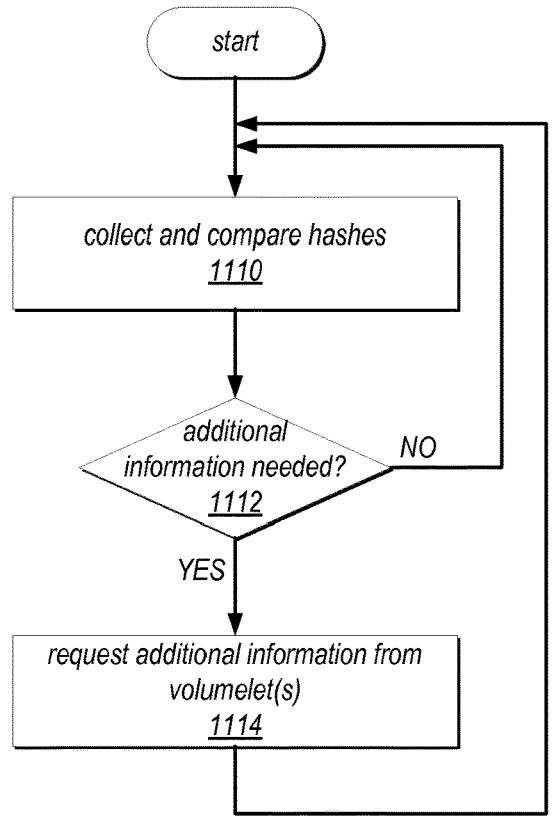
Figure 11C:
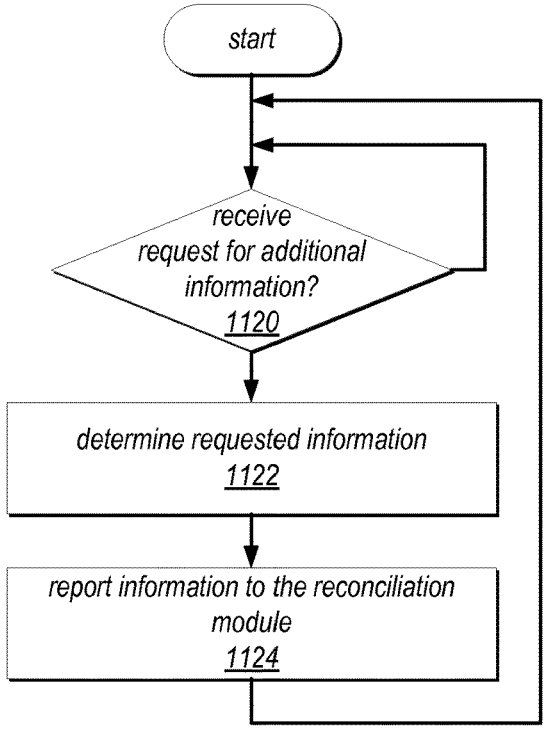

FIGS. 11A through 11C are flowcharts of an alternative method for comparing the volumelets of a cohort as part of a reconciliation process on an object-redundant storage system, according to at least some embodiments. FIGS. 11A and 11C may, for example, be performed on or by each storage node and/or volumelet as shown in an object-redundant storage system 200 as illustrated in FIG. 2A, while FIG. 11B may be performed at or by a central location such as a reconciliation process or module of a storage service 250 as illustrated in FIG. 2A. Instead of employing a "gossip" method as shown in the method of FIG. 10 in which each volumelet in a cohort communicates with each other volumelet in the cohort to determine differences between the volumelets which are then communicated to a central location such as a reconciliation module, in the method as shown in FIGS. 11A-11C, a volumelet periodically or aperiodically generates one or more or more common object lists, with each common object list corresponding to one of the other volumelets in the cohort. A hash function is then applied to each common object list, and the hash values are provided to a central location such as reconciliation module that collects hash values from the volumelets in the cohort and performs hash comparisons, difference determination, and reconciliation as necessary. The central location may, but does not necessarily, request additional information from a volumelet. Thus, a volumelet may, but does not necessarily, receive a request for additional information from the central location.

FIG. 11A is a high-level flowchart of a method for determining common object lists and generating hashes that may be performed at each volumelet of a cohort, according to at least some embodiments. As indicated at 1100 of FIG. 11A, a volumelet may determine or generate a common object list for at least one other volumelet in the cohort. A common object list for a given one of the other volumelets indicates the data objects that this volumelet has, or should have, in common with the other volumelet. In at least some embodiments, each data object may be indicated in the list by an object identifier (object ID). As indicated at 1102, the volumelet may generate a hash of each of the common object lists. In at least some embodiments, a hash tree technique as described in reference to FIGS. 8 and 9 may be used to generate the hash values (i.e., root hashes) for the common object lists. However, other hash techniques may be used in some embodiments. As indicated at 1104, the volumelet may send the generated hashes to a central location such as a reconciliation module. As indicated by the return arrow from 1104 to 1100, each volumelet may periodically or aperiodically repeat the method as shown in FIG. 11A.

FIG. 11B is a high-level flowchart of a method performed at or by a central location such as a reconciliation module or process, according to at least some embodiments. As indicated at 1110, the central location may collect hash values from all of the volumelets in the cohort, and may periodically or aperiodically (e.g., when hash values have been received from all volumelets in a cohort) perform hash comparisons. Based on the hash comparisons, difference determinations and reconciliations may be performed as necessary. In at least some embodiments, as part of difference determinations and/or reconciliation, the central location may determine that additional information is required from one or more volumelets. At 1112, if additional information is needed, then the central location may request additional information from the volumelet(s) as indicated at 1114. For example, the reconciliation module may request additional hash information (e.g., sublist hashes) and/or additional object ID information (e.g., lists or partial lists of object IDs) from one or more volumelets. As indicated by the return arrows from 1112 and 1114 to 1110, the central location may periodically or aperiodically repeat the method as shown in FIG. 11B.

FIG. 11C is a high-level flowchart of a method for handling requests for additional information that may be performed at each volumelet of a cohort, according to at least some embodiments. Note that the method of FIG. 11C may be performed asynchronously to the method of FIG. 11A. At 1120 of FIG. 11C, if a volumelet receives a request for additional information, then the requested information is determined at 1122, and reported to the reconciliation module at 1124.

Illustrative System

In at least some embodiments, a server that implements a portion or all of the methods and apparatus for volume cohorts in object-redundant storage systems as described herein may include a general-purpose computer system that includes or is configured to access one or more computer-accessible media, such as computer system 2000 illustrated in FIG. 13. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for volume cohorts in object-redundant storage systems, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 12 for implementing embodiments of volume cohorts in object-redundant storage systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of storage nodes;
one or more devices implementing a storage service configured to:
establish a cohort spanning the plurality of storage nodes;
select a respective subset of the storage nodes in the cohort for each data object of a plurality of data objects, each selected subset having less than all the storage nodes in the cohort, wherein for at least some of the plurality of data objects the respective selected subset includes one or more storage nodes in common with another selected subset selected for another data object and includes one or more storage nodes not in the other selected subset; and
for each data object of the plurality of data objects, store a set of object-redundant data elements generated from the data object to the respective selected subset of the storage nodes in the cohort selected for that data object;

wherein a first storage node of the storage nodes in the cohort is configured to:
generate, with respect to a second storage node of the storage nodes in the cohort, a first list of data objects each of which has a respective object-redundant data element stored on the first storage node and for which the first storage node and the second storage node are both in the selected subset for that data object, wherein the first list does not include data objects having respective object-redundant data elements stored on the first storage node for which the second storage node is not in the respective selected subsets for those data objects but one or more other storage nodes of the cohort are in the respective selected subsets for those data objects;
generate a first hash value for the first list of data objects;
receive, from the second storage node, a second hash value for a second list of those data objects having a respective object-redundant data element stored on the second storage node for which the second storage node and the first storage node are both in the respective selected subsets for those data objects;
determine that the first hash value does not match the second hash value;
in response to determining that the hash values do not match, notify a reconciliation process of the storage service that the hash values for the first storage node and the second storage node do not match; and
subsequent to notifying the reconciliation process, receive, from the reconciliation process, one or more of the data elements associated with a lack of a match of the hash values.

2. The system as recited in claim 1, wherein, in response to determining that the hash values do not match, the first storage node is further configured to determine one or more data objects for which corresponding data elements were to be written to both the first storage node and the second storage node, but are not on both of the first storage node and the second storage node, and report the determined one or more data objects to the reconciliation process of the storage service.

3. The system as recited in claim 1, wherein the reconciliation process is configured to reconcile data objects stored to the storage nodes in the cohort in response to notifications received from one or more of the storage nodes in the cohort, each notification indicating a specified two of the storage nodes for which the hash values do not match.

4. The system as recited in claim 1, wherein, to generate a hash value for the list of data objects, the first storage node is configured to generate the hash value from the list of data objects according to a hash technique that generates a hash tree from the list of data objects, wherein the hash value is a root hash of the hash tree.

5. The system as recited in claim 4, wherein, to determine one or more data objects for which corresponding data elements were to be written to both the first storage node and the second storage node, but are not on both of the first storage node and the second storage node, the first storage node is configured to analyze information in the hash tree to locate specific subsets of the data objects on the first storage node that are different than specific subsets on the second storage node.

6. The system as recited in claim 1, wherein the list of data objects includes object identifiers that identify each data object, and wherein, to generate a hash value for the list of data objects, the first storage node is configured to:
split the list into two or more sorted sublists according to the object identifiers;
generate one or more hash values for each sorted sublist, wherein each hash value is generated from the object identifiers of one or more of the data objects in the respective sorted sublist;
combine and hash the one or more hash values for each sorted sublist to generate two or more sublist hashes; and
combine and hash the combined sublist hashes to generate a root hash for the list of data objects, wherein the hash value for the list of data objects is the root hash.

7. The system as recited in claim 1, further comprising one or more other cohorts, wherein each of the cohorts comprises a corresponding set of the plurality of storage nodes that is less than the entirety of the storage nodes, wherein each subset of the storage nodes in the cohort to which a set of object-redundant data elements were to be written is selected according to a selection technique that randomly selects at least one of the storage nodes in the subset from among the plurality of storage nodes in the cohort.

8. A method, comprising:
storing, by a storage service implemented on one or more devices, sets of data elements generated from data objects to selected subsets of a plurality of volumelets implemented on a plurality of storage nodes in a cohort, the storing comprising:
selecting a respective subset of the volumelets for each data object of the data objects, each selected subset having less than all the volumelets in the cohort, wherein for at least some of the plurality of data objects the respective selected subset includes one or more volumelets in common with another selected subset selected for another data object and includes one or more volumelets not in the other selected subset; and
for each data object of the plurality of data objects, storing a set of object-redundant data elements generated from the data object to the respective selected subset of the volumelets selected for that data object;
generating, at a first node storing a first volumelet of the volumelets in the cohort, a first common object list of data objects each of which has a respective object-redundant data element stored on the first volumelet and for which the first volumelet and a second volumelet stored on a second storage node of the cohort are both in the selected subset for that data object, wherein the first common object list does not include data objects having respective object-redundant data elements stored on the first volumelet for which the second volumelet is not in the selected subset for that data object but one or more other volumelets of the cohort are in the selected subset for that data object;
generating a first hash value for the first common object list at the first volumelet;
receiving, from the second volumelet, a second hash value for a second common object list of those data objects having an object-redundant data element stored on the second volumelet for which the second volumelet and the first volumelet are both in the selected subset for that data object;
determining that the first hash value does not match the second hash value;
in response to said determining, identifying one or more data objects for which a corresponding element was to be written to each of the first volumelet and the second volumelet but is not currently stored on one of the first volumelet or the second volumelet; and responsive to the identifying, replacing the one or more corresponding elements that were to be written to, but are not currently stored on, the first volumelet or the second volumelet.

9. The method as recited in claim 8, wherein said determining and said identifying are performed at each of the first and second volumelets, wherein the method further comprises reporting the identified one or more data objects to a reconciliation process of the storage service.

10. The method as recited in claim 8, wherein the method further comprises providing the generated hash values to a reconciliation process of the storage service, wherein the reconciliation process performs said determining and said identifying.

11. The method as recited in claim 8, wherein the sets of object-redundant data elements are generated from the data objects according to an object-redundant technique, wherein the object-redundant technique is one of a replication technique or an erasure encoding technique.

12. The method as recited in claim 8, wherein said generating the first common object list at the first volumelet comprises generating the first common object list according to metadata stored with the data elements on the first volumelet, wherein the metadata for a given data element on the first volumelet indicates one or more other volumelets on which other data elements in the generated sets of data elements were to be written.

13. The method as recited in claim 8, wherein said generating the first common object list at the first volumelet comprises generating the first common object list according to object identifiers of the data objects that have a corresponding data element on the first storage node, wherein a transformation of an object identifier indicates one or more volumelets in the cohort at which other data elements generated for the first data object were to be written.

14. The method as recited in claim 8, wherein said generating the first hash value for the first common object list at the first volumelet comprises generating a first hash tree from object identifiers in the first common object list, wherein the first hash value is a root hash of the first hash tree.

15. A non-transitory computer-accessible storage medium storing program instructions executable on one or more computers to implement:

generating, at a first node storing a first volumelet of a plurality of volumelets implemented on a plurality of storage nodes in a cohort, a first common object list of data objects each of which has a respective data element stored on the first volumelet and for which the first volumelet and a second volumelet stored on a second storage node of the cohort are both in a selected subset for that data object wherein each of a set of data elements generated from the data object is stored at a corresponding volumelet of the selected subset, wherein the first common object list does not include other data objects having a respective data element stored on the first volumelet for which the second volumelet is not in a respective other selected subset for each of the other data objects but one or more other volumelets of the cohort are in one or more of the other selected subsets for the other data objects;

generating a first hash value for the first common object list at the first volumelet;

receiving, from the second volumelet, a second hash value for a second common object list of those data objects having a corresponding data element stored on the second volumelet for which the second volumelet and the first volumelet are both in the respective selected subsets for each of those data objects;

determining that the first hash value does not match the second hash value;

in response to said determining, identifying one or more data objects for which a corresponding element was to be written to the first volumelet but is not currently stored on the first volumelet; and responsive to the identifying, replacing the one or more elements that were to be written to, but are not currently stored on, the first volumelet.

16. The non-transitory computer-accessible storage medium as recited in claim 15, wherein, in said generating the first common object list at the first volumelet, the program instructions are further executable to implement generating the first common object list according to metadata stored with the data elements on the first volumelet, wherein the metadata for a given data element on the first volumelet indicates one or more other volumelets on which corresponding data elements associated with the corresponding data object, in the generated sets of data elements, were to have been written.

17. The non-transitory computer-accessible storage medium as recited in claim 15, wherein the first common object list includes object identifiers for data objects, and wherein, in said generating a hash value for the first common object list at the first volumelet, the program instructions are further executable to implement:

splitting the first common object list into two or more sorted sublists according to the object identifiers;

generating one or more hash values for each sorted sublist, wherein each hash value is generated from the object identifiers of one or more of the data objects in the respective sorted sublist;

combining and hashing the one or more hash values for each sorted sublist to generate two or more sublist hashes; and combining and hashing the combined sublist hashes to generate a root hash for the first common object list, wherein the hash value for the first common object list is the root hash.

18. The non-transitory computer-accessible storage medium as recited in claim 17, wherein the hash values for the sorted sublists of object identifiers, sublist hashes, and root hash form a hash tree with two or more levels, and wherein, in said identifying one or more data objects for which a corresponding element was to be written to each of the first and second volumelets but is not currently stored on one of the first or second volumelets, the program instructions are further executable to implement locating the one or more data objects according to the hash tree.

* * * * *